US011263798B2

(12) United States Patent
Howson et al.

(10) Patent No.: US 11,263,798 B2
(45) Date of Patent: Mar. 1, 2022

(54) MULTI-RENDERING IN GRAPHICS PROCESSING UNITS USING RENDER PROGRESSION CHECKS

(71) Applicant: Imagination Technologies Limited, Kings Langley (GB)

(72) Inventors: John Howson, St. Albans (GB); Steven Fishwick, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 16/888,763

(22) Filed: May 31, 2020

(65) Prior Publication Data
US 2020/0380755 A1 Dec. 3, 2020

(30) Foreign Application Priority Data
May 31, 2019 (GB) ..................... 1907765

(51) Int. Cl.
*G06T 1/20* (2006.01)
*G06T 15/00* (2011.01)
(Continued)

(52) U.S. Cl.
CPC ............ *G06T 15/005* (2013.01); *G06F 5/06* (2013.01); *G06F 9/4881* (2013.01); *G06T 1/20* (2013.01)

(58) Field of Classification Search
CPC . G06T 15/005; G06T 1/20; G06T 1/60; G06F 5/06; G06F 9/4881; G06F 9/5027
See application file for complete search history.

(56) References Cited

U.S. PATENT DOCUMENTS 10,387,990 B2    8/2019 Broadhurst et al.
10,395,336 B2    8/2019 Howson et al.
(Continued)

FOREIGN PATENT DOCUMENTS

CN    108305318 A     7/2018
DE    2 648 107 A1 * 10/2013    ............. G06F 12/08
(Continued)

OTHER PUBLICATIONS

Patney et al.; "Piko: A Framework for Authoring Programmable Graphics Pipelines"; ACM Transactions on Graphics, vol. 34; No. 4; Article 147; Jul. 27, 2015; pp. 1-13.

*Primary Examiner* — Jennifer Mehmood
*Assistant Examiner* — Donna J. Ricks
(74) *Attorney, Agent, or Firm* — Potomac Law Group, PLLC; Vincent M DeLuca

(57) ABSTRACT

A graphics processing unit having multiple groups of processor cores for rendering graphics data for allocated tiles and outputting the processed data to regions of a memory resource. Scheduling logic allocates sets of tiles to the groups of processor cores to perform a first render, and at a time when at least one of the groups has not completed processing its allocated sets of one or more tiles as part of the first render, allocates at least one set of tiles for a second render to one of the other groups of processor cores for processing. Progress indication logic indicates progress of the first render, indicating regions of the memory resource for which processing for the first render has been completed. Progress check logic checks the progress indication in response to a request for access to a region of the memory resource as part of the second render and enables access that region of the resource in response to an indication that processing for the first render has been completed for that region.

20 Claims, 12 Drawing Sheets

(51) Int. Cl.
*G06F 5/06* (2006.01)
*G06F 9/48* (2006.01)

(56) References Cited

U.S. PATENT DOCUMENTS

| | | | |
|---|---|---|---|
| 10,565,772 | B2 | 2/2020 | Howson et al. |
| 2011/0148919 | A1 | 6/2011 | Heggelund et al. |
| 2012/0176386 | A1* | 7/2012 | Hutchins .................. G06T 1/20 345/522 |
| 2013/0076761 | A1* | 3/2013 | Ellis ........................ G06T 1/20 345/502 |
| 2018/0197269 | A1 | 7/2018 | Broadhurst et al. |
| 2018/0197270 | A1 | 7/2018 | Howson et al. |
| 2018/0197271 | A1 | 7/2018 | Broadhurst et al. |
| 2018/0197323 | A1 | 7/2018 | Howson et al. |
| 2018/0357809 | A1* | 12/2018 | Lawless ................... G06T 1/20 |

FOREIGN PATENT DOCUMENTS

| | | | | |
|---|---|---|---|---|
| EP | 3349480 | A1 | 7/2018 | |
| GB | WO 01/95257 | A1 * | 12/2001 | ............ G06T 15/00 |
| GB | 2555929 | A | 5/2018 | |

\* cited by examiner

MULTI-RENDERING IN GRAPHICS PROCESSING UNITS USING RENDER PROGRESSION CHECKS

This invention relates to graphics processing systems and methods for performing multiple renders.

BACKGROUND

Graphics processing systems are typically configured to receive graphics data, e.g. from an application running on a computer system, and to render the graphics data to provide a rendering output. For example, the graphics data provided to a graphics processing system may describe geometry within a three-dimensional (3D) scene to be rendered, and the rendering output may be a rendered image of the scene. Some graphics processing systems (which may be referred to as "tile-based" graphics processing systems) use a rendering space which is subdivided into a plurality of tiles. The "tiles" are regions of the rendering space, and may have any suitable shape, but are typically rectangular (where the term "rectangular" includes square). To give some examples, a tile may cover a 16×16 block of pixels or a 32×32 block of pixels of an image to be rendered. As is known in the art, there are many benefits to subdividing the rendering space into tiles. For example, subdividing the rendering space into tiles allows an image to be rendered in a tile-by-tile manner, wherein graphics data for a tile can be temporarily stored "on-chip" during the rendering of the tile.

Tile-based graphics processing systems typically operate in two phases: a geometry processing phase and a rendering phase. In the geometry processing phase, the graphics data for a render is analysed to determine, for each of the tiles, which graphics data items are present within that tile. Then in the rendering phase, a tile can be rendered by processing those graphics data items which are determined to be present within that tile (without needing to process graphics data items which were determined in the geometry processing phase to not be present within the particular tile). The graphics data items may represent geometric shapes, which describe surfaces of structures in the scene, and which are referred to as "primitives". A common primitive shape is a triangle, but primitives may be other 2D shapes or may be lines or points also. Objects can be composed of one or more (e.g. hundreds, thousands or millions) of such primitives.

FIG. 1 shows some elements of a graphics processing system 100 which may be used to render an image of a 3D scene. The graphics processing system 100 comprises a graphics processing unit (GPU) 102 and two portions of memory $104_1$ and $104_2$. The two portions of memory $104_1$ and $104_2$ may, or may not, be parts of the same physical memory.

The GPU 102 comprises a pre-processing module 106, a tiling unit 108 and rendering logic 110, wherein the rendering logic 110 comprises a fetch unit 112 and processing logic 113 which includes one or more processor cores 114. The rendering logic 110 is configured to use the processor cores 114 to implement hidden surface removal (HSR) and texturing and/or shading on graphics data (e.g. primitive fragments) for tiles of the rendering space.

The graphics processing system 100 is arranged such that a sequence of primitives provided by an application is received at the pre-processing module 106. In a geometry processing phase, the pre-processing module 106 performs functions such as geometry processing including clipping and culling to remove primitives which do not fall into a visible view. The pre-processing module 106 may also project the primitives into screen-space. The primitives which are output from the pre-processing module 106 are passed to the tiling unit 108 which determines which primitives are present within each of the tiles of the rendering space of the graphics processing system 100. The tiling unit 108 assigns primitives to tiles of the rendering space by creating control streams (or "display lists") for the tiles, wherein the control stream for a tile includes indications of primitives which are present within the tile. The control streams and the primitives are outputted from the tiling unit 108 and stored in the memory $104_1$.

In a rendering phase, the rendering logic 110 renders graphics data for tiles of the rendering space to generate values of a render, e.g. rendered image values. The rendering logic 110 may be configured to implement any suitable rendering technique, such as rasterisation or ray tracing to perform the rendering. In order to render a tile, the fetch unit 112 fetches the control stream for a tile and the primitives relevant to that tile from the memory $104_1$. For example, the rendering unit may implement rasterisation according to a deferred rendering technique, such that one or more of the processor core(s) 114 are used to perform hidden surface removal to thereby remove fragments of primitives which are hidden in the scene, and then one or more of the processor core(s) 114 are used to apply texturing and/or shading to the remaining primitive fragments to thereby form rendered image values. Methods of performing hidden surface removal and texturing/shading are known in the art. The term "fragment" refers to a sample of a primitive at a sampling point, which is to be processed for rendering one or more pixels of an image. In some examples, there may be a one to one mapping of sample positions to pixels. In other examples there may be more sample positions than pixels, and this oversampling can allow for higher quality rendering of pixel values, e.g. by facilitating anti-aliasing and other filtering that may be applied to multiple fragments for rendering each of the pixel values. The texturing and/or shading performed on the fragments which pass the HSR stage determines pixel colour values of a rendered image which can be passed to the memory $104_2$ for storage in a frame buffer. Texture data may be received at the rendering logic 110 from the memory $104_1$ in order to apply texturing to the primitive fragments, as is known in the art. Shader programs may be executed to apply shading to the primitive fragments. The texturing/shading process may include applying further processing to the primitive fragments (e.g. alpha blending and other processes), as is known in the art in order to determine rendered pixel values of an image. The rendering logic 110 processes primitives in each of the tiles and when the whole image has been rendered and stored in the memory $104_2$, the rendered image can be outputted from the graphics processing system 100 and used in any suitable manner, e.g. displayed on a display or stored in memory or transmitted to another device, etc.

In some systems, a particular processor core can be used to perform hidden surface removal at one point in time and texturing/shading at another point in time. In some other systems, some of the processor cores are dedicated for performing hidden surface removal whilst others of the processor cores are dedicated for performing texturing and/or shading on primitive fragments.

The graphics processing system 100 described above is a deferred rendering system because the rendering logic 110 is configured to perform the HSR processing on a primitive fragment before the texturing/shading processing is applied to the primitive fragment. Other graphics processing systems are not deferred rendering systems in the sense that they are configured to perform the texturing and/or shading of primitive fragments before the HSR is performed on those primitive fragments. Deferred rendering systems avoid the processing involved in applying texturing and/or shading to at least some of the primitive fragments which are removed by the hidden surface removal process.

If the rendering logic 110 includes more than one processor core 114, then the processor cores can process different data in parallel, thereby improving the efficiency of the rendering logic 110. In some systems that include more than one processor core 114, the processor cores may be arranged into groups (referred to herein as processor groups). Each processor core within a group may share a resource of the graphics processing system. That resource could be a memory and/or processing resource of the graphics processing system. Each processor group may have its own allocated resource that is shared amongst the processor cores in that group. A processor group may contain one or more processor cores. The tiles may be assigned to processor groups of the rendering logic 110, such that the graphics data for rendering a particular tile is processed in a single processor group. The graphics data for rendering a different tile may be processed by a different, single processor group. Processing a particular tile in a single processor group (rather than spreading the processing of that particular tile across multiple processor groups) can have benefits such as an improved cache hit rate. Multiple tiles may be assigned to the same processor group, which can be referred to as having "multiple tiles in flight". If multiple tiles are assigned to the same processor group, the processor group may process those tiles by distributing the tiles across the one or more processor cores in that group, When all of the tiles for a render have been processed by the rendering logic 110, the render is complete. Then the results of the render (e.g. a rendered frame) can be used as appropriate (e.g. displayed on a display or stored in a memory or transmitted to another device, etc.), and the rendering logic 110 can process tiles of a subsequent render.

The above describes an exemplary series of processing steps performed during a single render. In practice, a graphics processing system is likely to perform multiple renders. Multiple renders may be performed to produce a single output frame, or final render. For example, multiple renders may be performed that each output values to a separate render target. A render target may refer to a buffer containing rendered image values generated from a render. The final output frame may be formed from one or more of these render targets to produce final shading values for each pixel of the output frame. Each render target may contain rendering values representing different information for the scene to be rendered. Example render targets include buffers storing diffuse colour information, buffers storing specular colour information, depth buffers, and stencil buffers. Some of these renders used to generate the final render may depend on a previous render, for example by referencing the results of that previous render. Other renders may be independent of each other; that is to say, a render may not depend on the results of another render.

SUMMARY

There is provided a graphics processing unit configured to process graphics data using a rendering space that is subdivided into a plurality of tiles, the graphics processing unit comprising:
 multiple groups of one or more processor cores configured to render graphics data by processing allocated tiles, wherein data for processed tiles is output to regions of a memory resource;
 scheduling logic configured to:
  allocate sets of one or more tiles to the groups of processor cores for rendering to perform a first render; and
  at a time when at least one of the groups of one or more processor cores has not completed processing its allocated set(s) of one or more tiles as part of the first render, allocate at least one set of one or more tiles for a second render to at least one of the other groups of one or more processor cores for processing;
 progress indication logic configured to maintain a progress indication indicating progress of the first render, the progress indication indicating regions of the memory resource for which processing for the first render has been completed; and
 progress check logic configured to check the progress indication in response to a processor core requesting access to a region of the memory resource as part of the second render and to enable the processor core to access that region of the resource in response to the progress indication indicating that processing for the first render has been completed for that region.

In examples described herein, said other groups of one or more processor cores are groups of one or more processors cores which have completed processing their allocated at least one set of one or more tiles as part of the first render.

The progress indication logic may be configured to update the progress indication in accordance with an update scheme as the first render progresses.

The progress check logic may be configured to re-check the progress indication each time the progress indication is updated.

The memory resource may be arranged as a two-dimensional array corresponding to the tiles of the rendering space such that the processing for the first render has been completed for a region of the memory resource when the one or more tiles corresponding to that memory region have been rendered for the first render.

The progress check logic may be configured to check the progress indication by mapping the spatial location in the memory resource of the access request to an area of the rendering space and using the progress indication to determine whether all the tiles within that area have been processed in accordance with the first render.

The progress indication may identify at least a subset of rendering areas of the rendering space for which processing has been completed for the first render, each rendering area comprising at least one tile.

Each of the rendering areas may be of at least equal dimensions to each set of one or more tiles assigned to the processor cores.

The progress indication may identify each of the rendering areas of the rendering space for which processing has been completed for the first render The progress indication may comprise a set of flags corresponding to each of the rendering areas, and the progress indication logic is configured to set the flag corresponding to a rendering area when the processing of each tile within that area has been completed for the first render.

The progress indication may identify a consecutive sequence of rendering areas in accordance with a predetermined order for which processing has been completed for the first render.

The progress indication logic may be configured to update the progress indication upon completion of the processing of a rendering area that extends the consecutive sequence of rendering areas in accordance with the predetermined order.

The progress indication may comprise a counter indicating the number of rendering areas in the consecutive sequence for which processing has been completed for the first render.

The progress indication logic may comprise a first-in-first-out (FIFO) buffer for controlling the incrementing of the counter, the buffer being configured to receive a sequence of values corresponding to respective rendering areas, each value indicating whether the processing of its corresponding rendering area has been completed for the first render.

The FIFO buffer may be configured to output its leading value when that value indicates the processing of its corresponding rendering area has been completed for the first render, and to not output its leading value when that value indicates that the processing of its corresponding rendering area has not been completed for the first render; and wherein the counter is configured to increment in response to the buffer outputting its leading value.

Each group of one or more processor cores may contain only a single processor core.

Each group of one or more processor cores may contain a plurality of processor cores.

Each of the plurality of processor cores within a group may share a common processing resource of the graphics processing unit.

The graphics unit may further comprise a buffer configured to buffer access requests to regions of the memory resource, the progress check logic being configured to cause an access request to be buffered when the progress indication indicates that the processing for the first render has not been completed for the region of the memory resource specified by that access request.

The buffer may be arranged so that a request for a processing resource needed to complete the processing for the first render for a region of the memory resource specified by an access request located in the buffer is not impeded by the access request located in the buffer.

There is provided a method of processing graphics data in a graphics processing unit comprising multiple groups of one or more processor cores, the graphics processing unit being configured to use a rendering space that is sub-divided into a plurality of tiles; the method comprising:
  performing a first render by allocating sets of one or more tiles to the groups of processor cores for rendering and outputting data for the processed tiles to regions of a memory resource;
  at a time when at least one of the groups of one or more processor cores has not completed processing its allocated set(s) of one or more tiles as part of the first render, allocating at least one set of one or more tiles for the second render to at least one of the other groups of one or more processor cores for processing;
  maintaining a progress indication indicating progress of the first render, the progress indication indicating regions of the memory resource for which processing for the first render has been completed;
  checking the progress indication in response to a processor core requesting access to a region of the memory resource as part of the second render; and
  accessing that region of the resource in response to the progress indication indicating that processing for the first render has been completed for that region of the memory resource.

The method may further comprise updating the progress indication in accordance with an update scheme as the first render progresses.

The method may comprise re-checking the progress indication each time the progress indication is updated.

The memory resource may be arranged as a two-dimensional array corresponding to the tiles of the rendering space such that the processing for the first render has been completed for a region of the memory resource when the one or more tiles corresponding to that memory region have been rendered for the first render.

The progress indication may be checked by mapping the spatial location in the memory resource of the access request to an area of the rendering space and using the progress indication to determine whether all the tiles within that area have been processed in accordance with the first render.

The progress indication may identify at least a subset of rendering areas of the rendering space for which processing has been completed for the first render, each rendering area comprising at least one tile.

Each of the rendering areas may be of at least equal dimensions to each set of one or more tiles assigned to the processor cores.

The progress indication may identify each of the rendering areas of the rendering space for which processing has been completed for the first render.

The progress indication may comprise a set of flags corresponding to each of the rendering areas, and the progress indication logic is configured to set the flag corresponding to a rendering area when the processing of each tile within that area has been completed for the first render.

The progress indication may identify a consecutive sequence of rendering areas in accordance with a predetermined order for which processing has been completed for the first render.

The method may comprise updating the progress indication upon completion of the processing of a rendering area that extends the consecutive sequence of rendering areas in accordance with the predetermined order.

The progress indication may comprise a counter indicating the number of rendering areas in the consecutive sequence for which processing has been completed for the first render.

The method may comprise receiving at a buffer a sequence of values corresponding to respective rendering areas, each value indicating whether the processing of its corresponding rendering area has been completed for the first render, and using the sequence of values in the buffer to control the incrementing of the counter.

The method may comprise outputting from the buffer its leading value when that value indicates the processing of its corresponding rendering area has been completed for the first render, and incrementing the counter in response to the buffer outputting its leading value.

Each group of one or more processor cores may contain only a single processor core.

Each group of one or more processor cores may contain a plurality of processor cores.

Each of the plurality of processor cores within a group may share a common processing resource of the graphics processing unit.

The method may further comprise buffering in a buffer access requests to regions of the memory resource when the progress indication indicates that the processing for the first render has not been completed for the regions of the memory resource specified by those access requests.

The buffer may be arranged so that a request for a processing resource needed to complete the processing for the first render for a region of the memory resource specified by an access request located in the buffer is not impeded by the access request located in the buffer.

The graphics processing unit may be embodied in hardware on an integrated circuit. There is provided a method of manufacturing, using an integrated circuit manufacturing system, a graphics processing unit as described herein. There is provided an integrated circuit definition dataset that, when processed in an integrated circuit manufacturing system, configures the system to manufacture a graphics processing unit as described herein.

There is provided a non-transitory computer readable storage medium having stored thereon a computer readable description of an integrated circuit that, when processed in an integrated circuit manufacturing system, causes the integrated circuit manufacturing system to manufacture a graphics processing unit as described herein. There is provided an integrated circuit manufacturing system configured to manufacture a graphics processing unit as described herein.

There is provided an integrated circuit manufacturing system comprising:
  a non-transitory computer readable storage medium having stored thereon a computer readable integrated circuit dataset description that describes a graphics processing unit as described herein;
  a layout processing system configured to process the integrated circuit description so as to generate a circuit layout description of an integrated circuit embodying the graphics processing unit; and
  an integrated circuit generation system configured to manufacture the graphics processing unit according to the circuit layout description.

There is provided a graphics processing unit configured to perform a method as described herein. There is provided computer program code for performing a method as described herein. There is provided a non-transitory computer readable storage medium having stored thereon computer readable instructions that, when executed at a computer system, cause the computer system to perform a method as described herein.

BRIEF DESCRIPTION OF THE DRAWINGS

The present invention will now be described by way of example with reference to the accompanying drawings. In the drawings.

DETAILED DESCRIPTION

The present disclosure is directed to processing graphics data in a graphics processing system that comprises multiple groups of one or more processor cores. The graphics processing system performs a first render by assigning sets of one or more tiles to the processor core groups for rendering. Contrary to standard rendering techniques, the graphics processing system then initiates a second render at a time when the first render is not complete. To do this, sets of one or more tiles for the second render are assigned to at least one group of processor cores at a time when at least one of the other groups of processor cores has not completed processing its tiles assigned as part of the first render. Thus the processing of the second render may be interleaved, to some extent, with the processing of the first render, with one or more processor core groups processing sets of tiles as part of the first render whilst one or more other groups of processor cores are processing sets of tiles as part of the second render. The second render may or may not depend on the first render (that is, the second render may or may not reference the results of the first render). In response to a processor core, working on the second render, requesting data from a region of a memory modifiable by the still in progress first render, a progress indication is checked. If the progress indication identifies that all of the necessary work associated with that requested region of memory has been completed, the processor core that requested access as part of the second render is granted access to that region of the memory resource. The request by the second render to a region of memory being processed in the first render may be allowed to proceed without having to wait for all processing associated with the first render to be completed. The progress indicator can be used to avoid a situation in which a processor core that is performing processing as part of the second render requests access to a region of memory before data from the first render has finished modifying that region of memory.

As used herein, a processor group refers to a group of one or more processor cores. Each processor core within a group may share a common processing resource. That processing resource could be a hardware resource, for example a texture unit. However, in other examples, the processor groups do not correspond to any particular hardware arrangement within the graphics processing unit. A processor group may refer to the granularity at which processor cores are allocated tiles, or tile sets, to be processed as part of a render.

Figure 1:
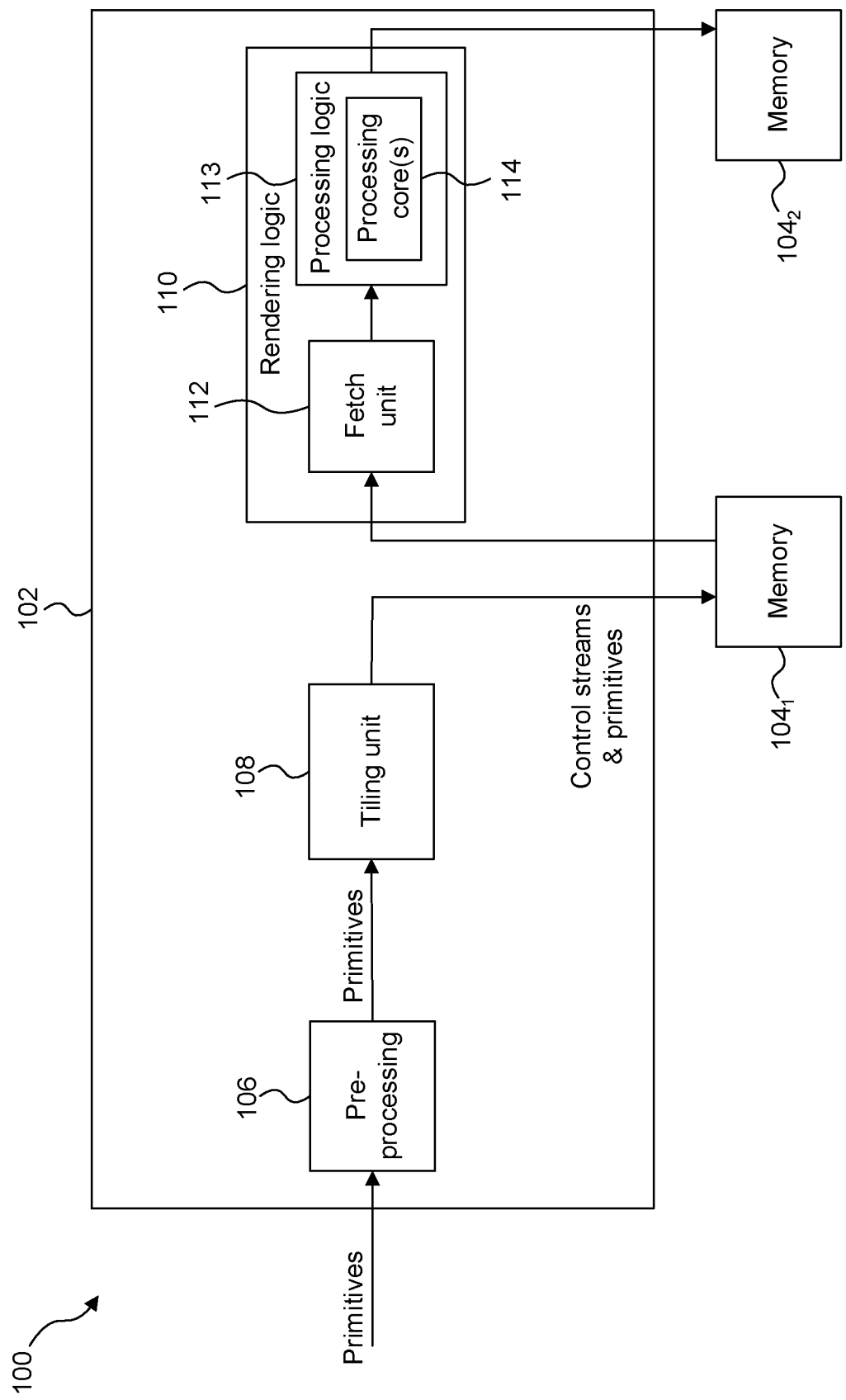
FIG. 1 shows a graphics processing system.
Figure 2:
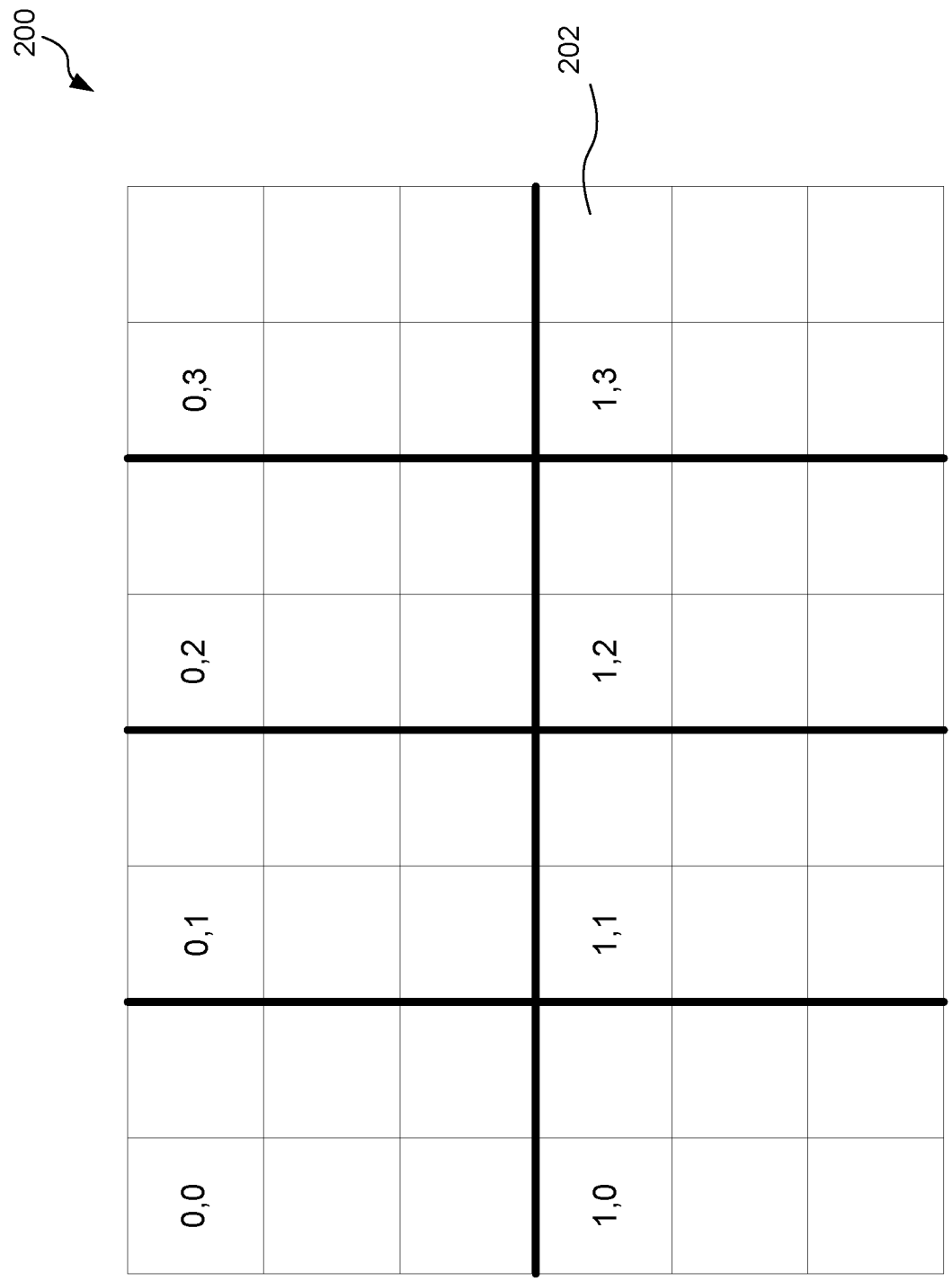
FIG. 2 shows a rendering space divided into a plurality of tile sets, each tile set containing a block of tiles.

FIG. 2 shows an example of a rendering space 200. The rendering space is divided into a plurality of tiles 202. In this example, the rendering space is divided into an 8×6 block of tiles for the purposes of illustration. The tiles may be grouped into sets of one or more tiles that can be assigned to the processor cores 114 of the graphics processing system 100 to perform a render N. As described above, the processor cores 114 may be arranged into one or more processor groups, where each processor group contains one or more processor cores. In this case, the tile sets are allocated to the processor groups. Each processor group then processes its allocated tile set by distributing the tiles in the tile set across the one or more processor cores in that group.

The sets into which the tiles may be grouped are illustrated in FIG. 2 by the thicker border line, and may be referenced by their spatial position within the rendering space as: (0,0); (0,1); (0,2); (0,3); (1,0); (1,1); (1,2) and (1,3). That is, in this example tiles of the rendering space are grouped into eight sets of tiles, where each set of tiles is formed of a 2×3 sub-block of tiles. Thus in this example each set contains six tiles, but sets could equally be formed of fewer (e.g. one) or more tiles. The size of the sets here has again been chosen merely for illustration. The sets may each be of the same size (as shown here) or different sizes. Though the tiles of each set are shown here as a contiguous block of tiles, each set of tiles need not be formed from a contiguous block of tiles and could alternatively be formed of separated tiles within the rendering space. In some examples, the size of the tile sets may vary depending on the type of render. That is, the size of the tile sets may vary between renders. In other examples, the size of the tile sets may be set based on workload estimates, knowledge from previously rendered frames, or other externally supplied information (e.g. information supplied from a component external of the graphics processing unit).

To perform the render N, the sets of tiles are assigned to the processor cores 114 of the graphics processing system 100.

Figure 3A:
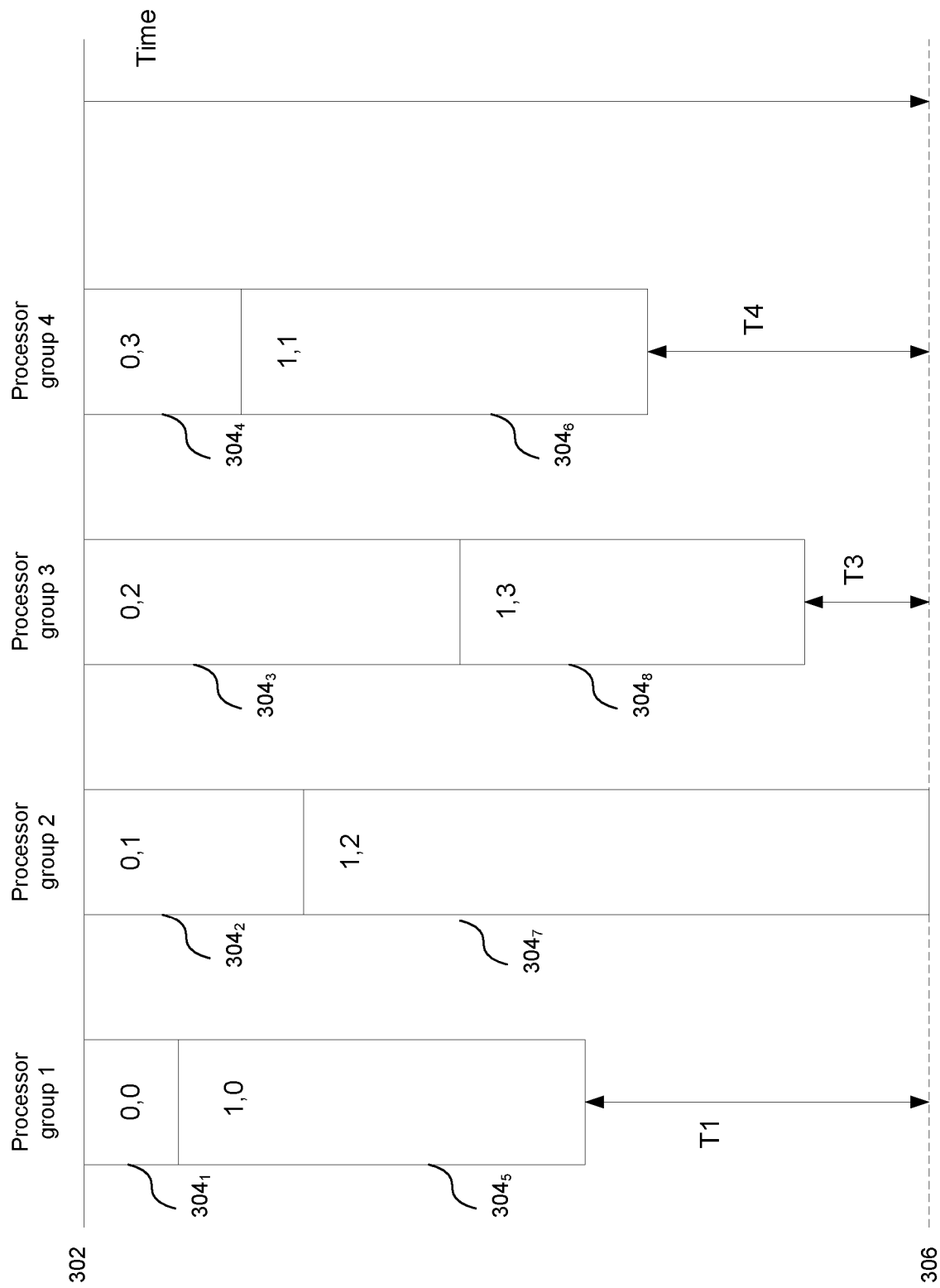
FIG. 3A shows an example of a tile workload distribution across groups of processor cores of a GPU when rendering the tiles of the rendering space in FIG. 2.

FIG. 3A illustrates the timing of execution of the sets of tiles on the processor cores 114. In this illustration, the graphics processing system 100 is taken to include four processor groups.

The vertical axis has time running downwards from a render start time 302. In this example, the sets of tiles are assigned, or allocated, to the processor groups in raster scan order, but in other examples sets of tiles could be allocated to the processor cores in any other suitable order. Once a processor group has finished processing its assigned set of tiles, the next set of tiles according to a specified ordering pattern is assigned to that processor group. The tile sets may be assigned according to any suitable ordering pattern, for example raster scan order, N order, Z order etc. In this example, the tile sets are assigned to the processor groups in raster scan order. So, initially, the first four sets of tiles from the top row of the rendering space (sets (0,0), (0,1), (0,2) and (0,3)) are allocated to respective ones of the processor groups. Processor group 1 is the first group to finish processing its allocated tile set, and so the next tile set according to the raster scan order (tile set (1,0)) is then allocated to processor group 1. Processor group 4 is the second group to finish processing its allocated tile set, and so the next tile set according to the raster scan order (tile set (1,1)) is then allocated to processor group 4. This scheduling continues until all the sets of tiles of the rendering space have been allocated to processor groups, as shown in FIG. 3A. The blocks $304_{1-8}$ indicate the time that a processor group spends processing a respective set of tiles.

Once the processing for all the tile sets has been completed, the render N is complete. The render end-time is denoted at 306. It is noted the final tile set to have its processing completed is not necessarily the tile set that was last to be allocated to a processor group. This is because different tile sets may take different amounts of time to process, for example because they depict regions of differing complexity. In this example, the last tile set to be processed to completion is the tile set (1,2), but the last tile set to be allocated to a processor group was tile set (1,3).

The graphics processing system 100 may perform a subsequent render N+1, for example as part of performing multiple renders to generate a final render for output. Typically, the processing for render N+1 is not started until the processing of the previous render N has been completed. That is, typically, the rendering pipeline implemented by the processor cores 114 is drained before the processing of the next render begins. With reference to FIG. 3A, this would mean that the processor cores 114 would not begin processing any tiles for render N+1 until the render end time 306 for render N. This approach is typically adopted to avoid the situation where a processor core executing a set of tiles as part of the render N+1 needs to reference data generated from the render N, but that data has not yet been generated because the processing of render N has not progressed sufficiently far.

However, a problem with this approach is that it may result in idle time within the processor cores. For example, waiting for the render end time 306 before beginning the processing for render N+1 would introduce an idle time $T_1$ for processor group 1; $T_3$ for group 3 and $T_4$ for group 4. This problem may be particularly acute when the work required to perform a render is not distributed evenly across the sets of tiles, but instead concentrated within particular sets of tiles. This can result in some processor groups taking significantly longer to complete the processing for the first render than other processor groups, which may leave a large number of processor cores idle for significant amounts of time.

If the renders N and N+1 are independent of each other—that is to say, render N+1 does not reference any results generated from render N—then one approach to address the problem of idle time is to initiate the render N+1 before render N has completed. To do this, sets of tiles for the subsequent render N+1 are allocated to selected ones of the processor groups at a time when other ones of the processor groups are still processing sets of tiles allocated as part of the render N.

Figure 3B:
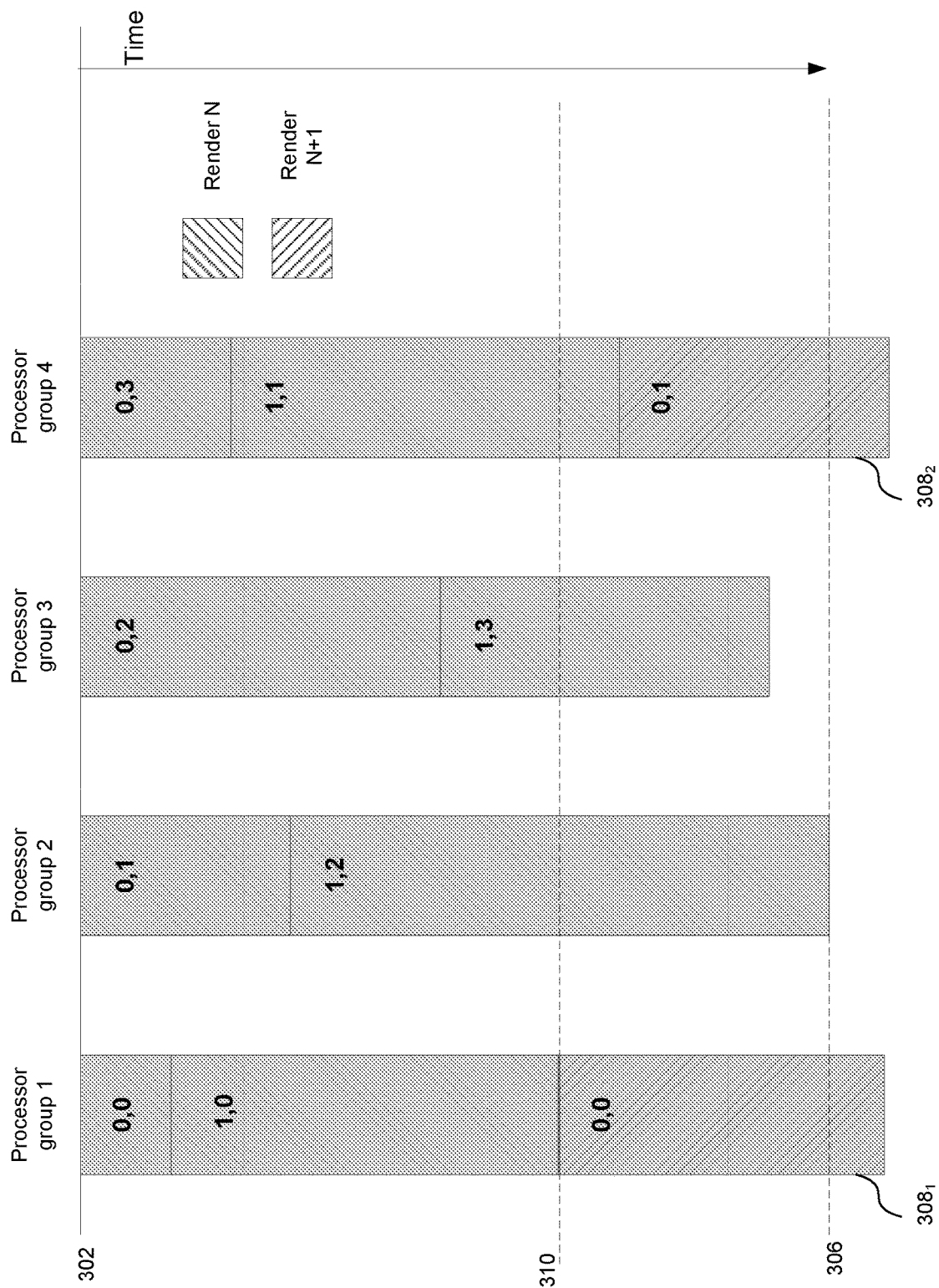
FIG. 3B shows an example of a tile workload distribution across groups of processor cores of a GPU when performing a first render for the tiles of the rendering space in FIG. 2, and initiating a second render for the tiles.

FIG. 3B illustrates how sets of tiles for render N+1 can be allocated to processor groups at a time when other ones of the processor groups are still processing tiles as part of the render N. Again, each processor group may contain one or more processor cores.

In FIG. 3B, the work done in processing sets of tiles as part of the renders N and N+1 is differentiated by different hatched markings. Blocks $304_{1-8}$ indicate the time spent processing the respective tile sets as part of render N, as shown in FIG. 3A. Blocks $308_{1,2}$ indicate the time spent processing the respective tile sets (0,0) and (0,1) for render N+1. In can be seen that in this example, the set of tiles (0,0) for render N+1 is allocated to processor group 1 at a time 310 when the remaining processor groups 2-4 are still processing tile sets allocated as part of the previous render N. Thus, render N+1 is initiated at a time when at least one of the processor groups is still processing tile sets for the render N (i.e., render N+1 is initiated at a time before the render end-time 306 for render N). It can be seen from this Fig. how this approach can reduce, or in some cases potentially eliminate, idle time of the processor cores.

This approach illustrated in FIG. 3B works well when renders N and N+1 are independent of each other. However, it is common for a subsequent render to be at least partly dependent on a previous render such that in order to complete render N+1, data generated from render N needs to be referenced, or accessed. Similarly, it is common for dependencies between renders to not be known in advance of starting a render as the locations of the regions of a memory to be read may be programmatically determined at execution time. If renders N and N+1 are not independent of each other, then the approach illustrated in FIG. 3B of simply allocating sets of tiles for the next render to available processor groups and then processing those sets of tiles without regard to the progress of the previous render may cause incorrect data to be read during processing.

One problem that may arise is that one or more incorrect values may be read as part of the render N+1. For example, referring again to FIG. 3B, the processing of the tile set (0,1) for render N+1 may require reference to a data value generated from the processing of tile set (1,2) of render N at a time when that value has yet to be generated by processor group 2. In this case, when attempting to access the data value from a memory resource, some other value (e.g. generated by a render prior to render N) may be accessed instead. Thus, initiating render N+1 before processing for render N has completed may be particularly risky when the graphics processing system has no knowledge of the progress of render N.

In the examples described herein, a second render is initiated by allocating sets of one or more tiles for the second render to processor cores of a multi-core GPU at a time when other ones of the processor cores have not yet completed processing allocated sets of tiles as part of a first render. The second render may or may not be dependent on the first render. As the sets of tiles are processed as part of the first render, a progress indication is maintained that indicates the progress of the first render. If a processor core requests, as part of processing the second render, access to a region of a memory resource storing data from the first render, the progress indication is checked, and the processor core is enabled access to the region of the memory resource if the progress indication indicates that processing for the first render has been completed for that region of the memory resource. If the progress indication indicates that processing for the first render has not been completed for that region of the memory resource, the access to that region of the resource may be blocked. In this manner, the situation where access to a region of a memory resource is made as part of processing the second render before the data from the first render is written to that region can be avoided. The memory resource may comprise multiple regions that store data generated by the processor cores when performing the first render. The memory resource could be a resource of the graphics processing unit. It could for example be a cache capable of being accessed (e.g. via a memory resource access unit) by the processor cores when performing the renders. Alternatively, the memory resource may not form part of the graphics processing unit but could be part of the computer system of which the graphics processing unit forms part. For example, the memory resource could be, or form part of, the system memory of the computer system.

Figure 4:
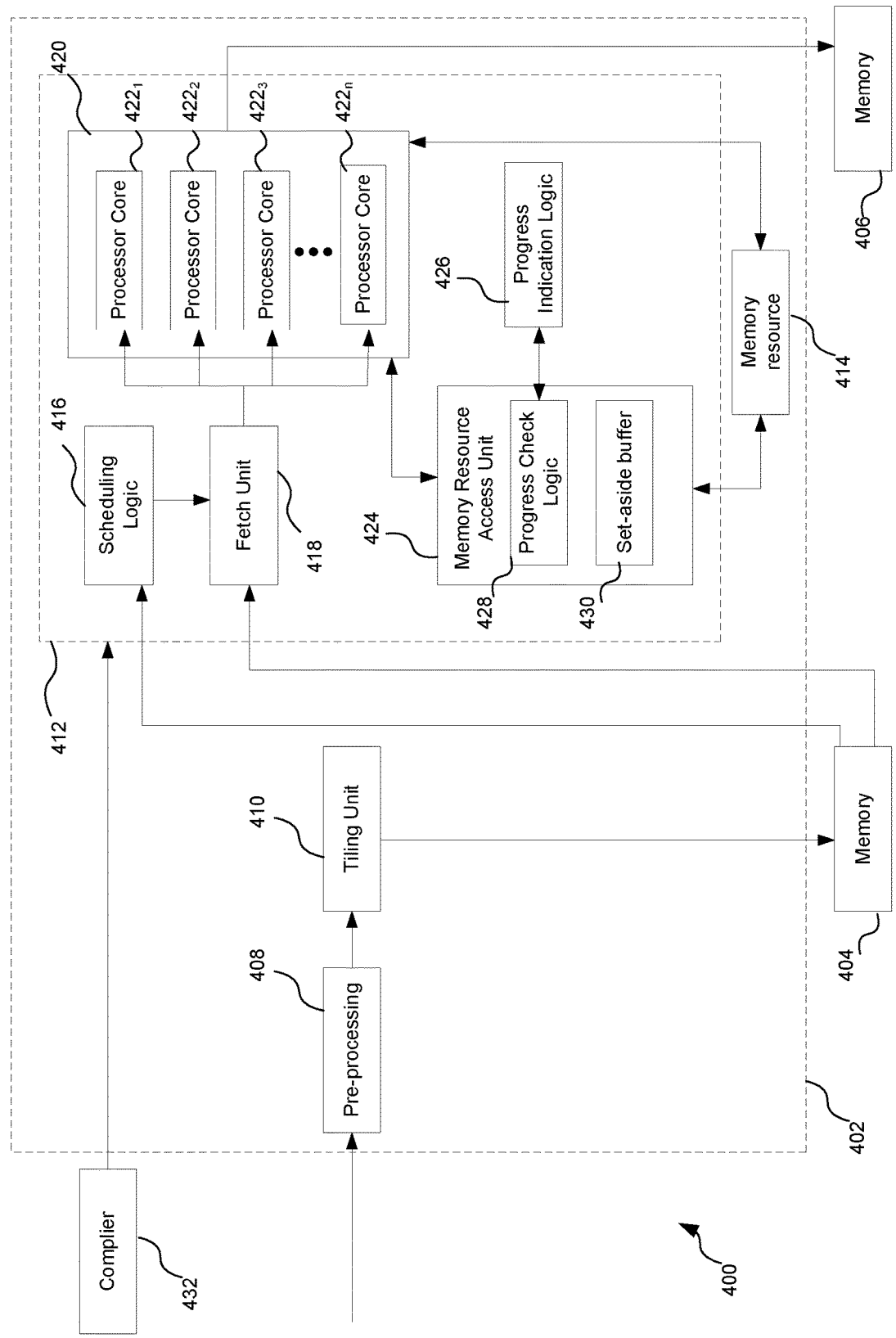
FIG. 4 shows an example of a graphics processing system in accordance with the present disclosure.

FIG. 4 shows an example of a graphics processing system 400 configured to process graphics data to render an image of a scene.

The graphics processing system comprises a graphics processing unit (GPU) 402 and two portions of memory 404 and 406. The two portions of memory may or may not be parts of the same physical memory. The GPU 402 comprises a pre-processing module 408; a tiling unit 410, rendering logic 412 and a memory resource 414. The memory resource could be cache, buffer, or some other type of on-chip memory. The memory resource could be a set of one or more caches or buffers. The memory resource may store data generated during, or from, the first render. There may be a respective memory resource for each processor core, or a memory resource for each of a number of groups of processor cores, e.g. for each pair of processor cores. The rendering logic 412 comprises scheduling logic 416; a fetch unit 418; processing logic 420 (which itself comprises a plurality of processor cores $422_{1, 2 \ldots n}$); a memory resource access unit 424 and progress indication logic 426. The memory resource access unit 424 itself comprises progress check logic 428 and a set aside buffer 430.

In an alternative example, memory resource 414 may be external to the GPU 402. For example, the memory resource 414 may be a set of one or more logical partitions of the system memory, e.g. of memory 406. In other examples there may be multiple memory resources, some local to the GPU 402, and others in system memory.

The rendering logic 412 is configured to use the processor cores 422 of the processing logic 420 to implement hidden surface removal (HSR) and texturing and/or shading on graphics data (e.g. primitive fragments) for tiles of the rendering space. The graphics processing system 400 also comprises a compiler 432 configured to compile programs (e.g. shader programs) to be executed on the GPU 402. The compiler 432 may write compiled shader programs to an intermediate memory, wherein at runtime the GPU 402 retrieves the compiled shader programs from the intermediate memory, but for simplicity, the intermediate memory is not shown in FIG. 4. The rendering logic 412 comprises any suitable number of processor cores, e.g. in the range of 1 to 256, or even higher. The number of processor cores in the rendering logic 412 may be adapted to suit the intended use of the graphics processing system (e.g. a graphics processing system to be used in a small mobile device which has tight constraints on processing resources and silicon size may include a small number of processor cores (e.g. 6 processor cores), whereas a graphics processing system to be used in a large device such as a PC or server which has less tight constraints on processing resources and silicon size may include a larger number of processor cores (e.g. 128 processor cores)).

Figure 5:
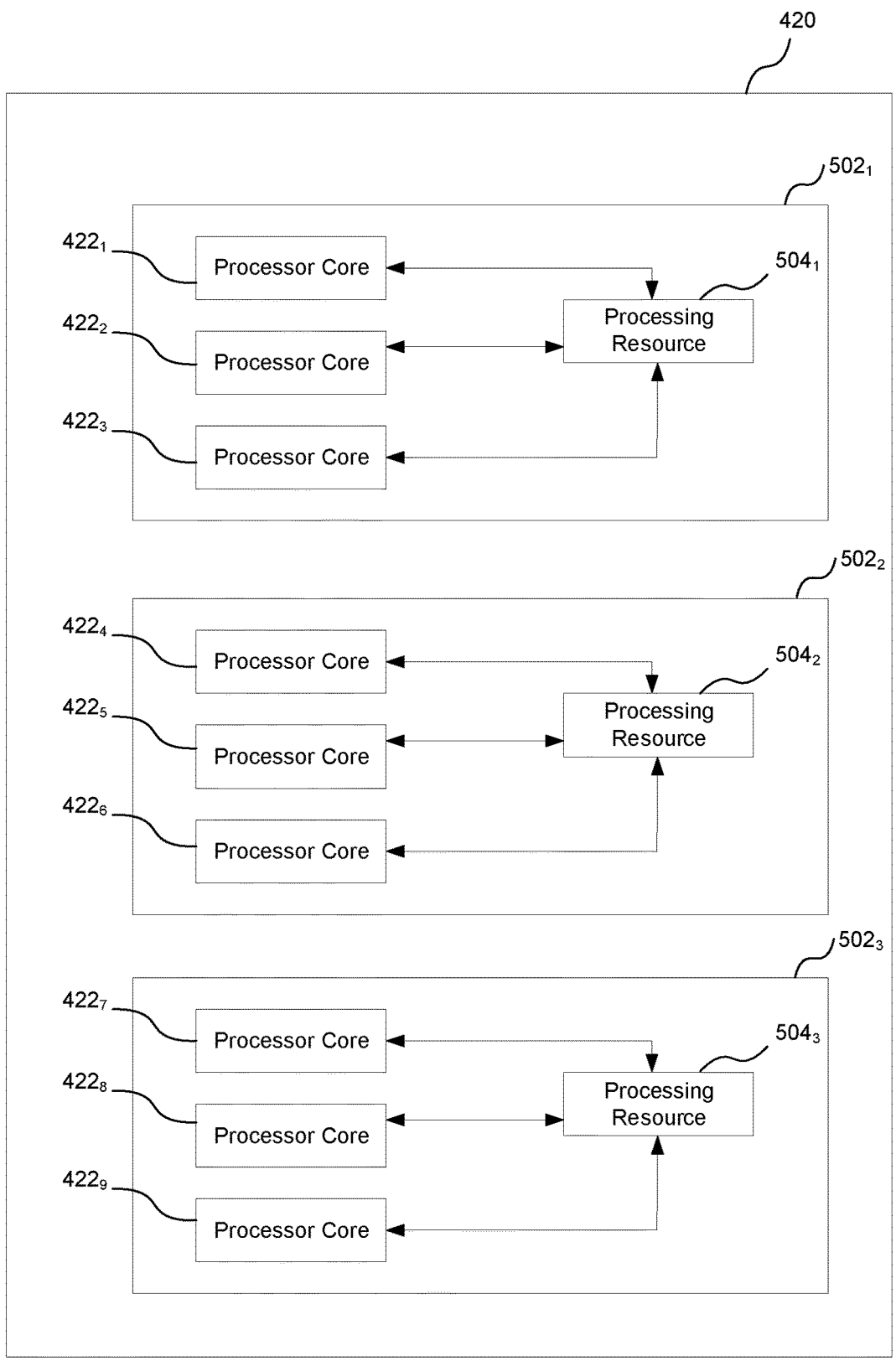
FIG. 5 shows an example architecture of the processing logic forming part of the graphics processing system of FIG. 4.

The processor cores 422 of the processing logic 420 may be arranged in groups (referred to herein as processor groups). Each processor group contains one or more processor cores. FIG. 5 shows how the processor cores 422 of the processing logic 420 may be grouped.

In this example, the processing logic 420 is taken to have nine processor cores arranged into three processor groups $502_{1,2,3}$. Each processor group comprises three processor cores 422. The first processor group $502_1$ contains processor cores $422_{1,2,3}$, the second processor group $502_2$ contains processor cores $422_{4,5,6}$, and the third processor group $502_3$ contains processor cores $422_{7,8,9}$. Of course, in other examples, different numbers of processor cores may be grouped together, and the processing logic may comprise different numbers of processor groups depending on how many processor cores the processing logic comprises. In some examples, each processor group may contain a single processor core.

In this example each processor group comprises its own processing resource $504_{1,2,3}$. The processing resource could be a hardware resource shared by each processor core in the group. The processing resource may make memory accesses, e.g. to memory resource 414, on behalf of a processor core in the group, or in order to complete a processing task requested by a processor core in the group.

The processing resource could for example be a texture processing unit configured to handle texture accesses. The texture processing unit may receive texel requests and convert those requests to a memory address in order to access that texture from memory. The texture processing unit may be configured to perform texture sampling. That is, the texture processing unit may be configured to retrieve one or more texel values from memory based on a received request and to filter those texel values to produce a single texture colour for a texture-mapped pixel. The shared processing resources $504_{1,2,3}$ need not be texture processing units but could be some other form of shared hardware resource. It could for example be a shared memory, e.g. a cache.

Figure 6:
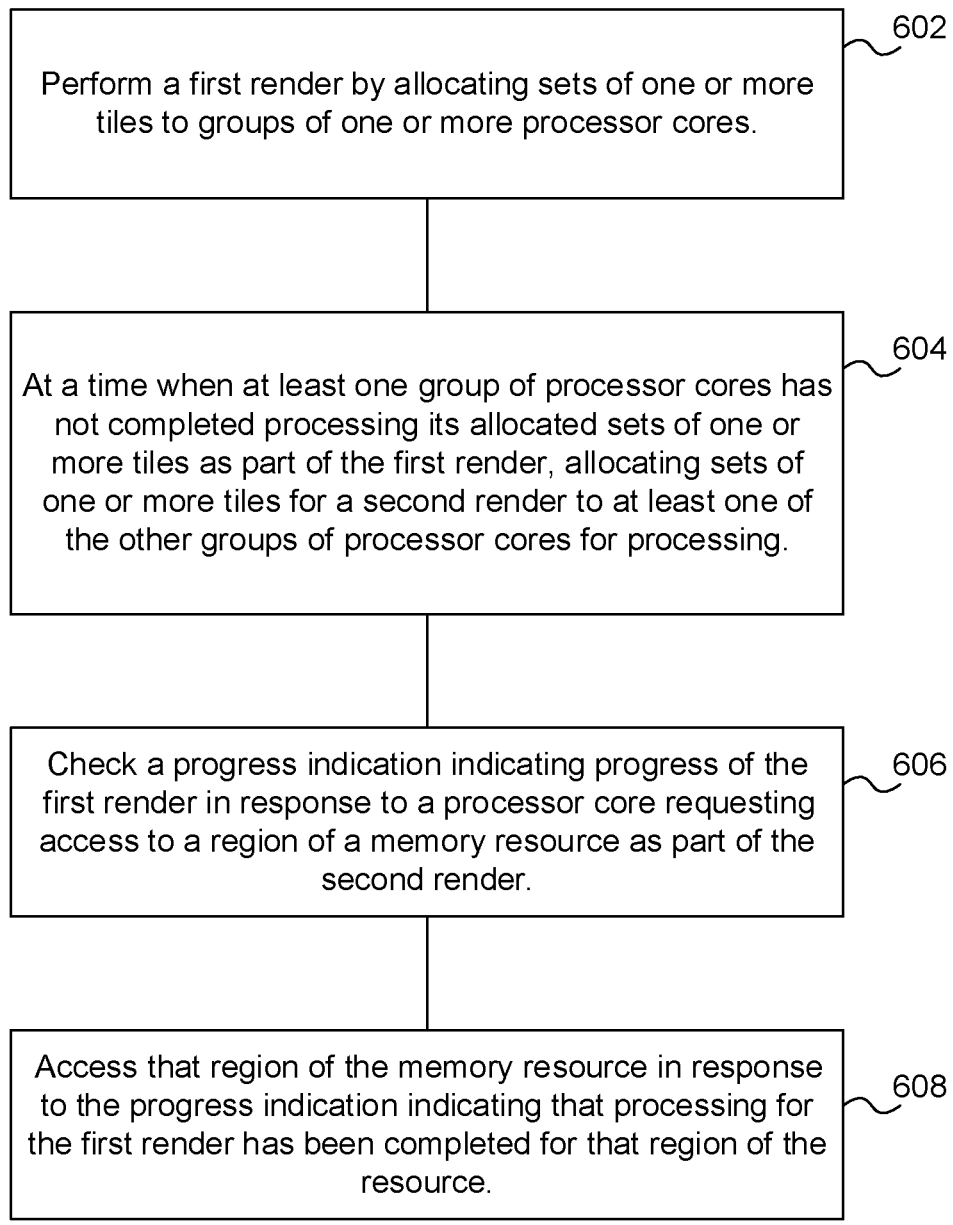
FIG. 6 shows a flow chart for a method of processing graphics data using the graphics processing system.

The operation of the graphics processing system 400 will now be described with reference to the flowchart in FIG. 6.

Graphics data for performing a render is received at the graphics processing unit 402, e.g. from a game application running on a CPU in the same computing system as the graphics processing unit. The graphics data may include primitive data describing primitives of objects in a scene to be rendered. The graphics data may also specify one or more shader programs which are to be executed on the primitive data for rendering the primitives. It is noted that shaders specifying position (e.g. vertex and geometry shaders) are executed on primitives; whereas shaders specifying how the image will be rendered (e.g. pixel shaders) are executed on fragments that are covered by a primitive's location.

A sequence of primitives provided by an application may be received at the pre-processing module 408. In a geometry processing phase, the pre-processing module 408 performs functions such as geometry processing including clipping and culling to remove primitives which do not fall into a visible view. The pre-processing module 408 may also project the primitives into screen-space. The primitives which are output from the pre-processing module 408 are passed to the tiling unit 410 for tiling as described below.

The tiling unit 410 determines which primitives are present within each of the tiles of the rendering space of the graphics processing system 400. The tiling unit 410 assigns primitives to tiles of the rendering space by creating control streams for the tiles, wherein the control stream for a tile includes indications of primitives which are present within the tile. The control streams and the primitives are outputted from the tiling unit 410 and stored in the memory 404. The geometry processing phase (performed by the pre-processing module 408 and the tiling unit 410) takes account of primitives across the whole of an image, i.e. for all of the tiles in the image. Then in the rendering phase, the rendering logic 412 renders tiles of the image and stores the outputs for rendered tiles in appropriate portions of a framebuffer, such that when all of the tiles of an image have been rendered, the framebuffer stores the rendered results for the whole image.

At step 602, a first render is performed by allocating sets of one or more tiles to the processor groups $502_{1,2,3}$ for rendering, and outputting data for the processed tiles to regions of memory resource 414.

The scheduling logic 416 allocates the sets of one or more tiles to the processor groups based on a scheduling order. That scheduling order could for example be the raster scan order. Alternatively, the scheduling logic may implement some other scheduling order, such as a z-order. When a processor group has finished processing an allocated set of tiles, the scheduling logic allocates to that available group the next set of tiles in accordance with the implemented scheduling order.

Each set of tiles may include one or more tiles. Similarly to the examples described above with reference to FIG. 2, the tiles of each set may be arranged in a contiguous block within the rendering space (in the case that there is more than one tile in a set). That is, each set of tiles may be arranged as a block of tiles within the rendering space. Equally, each set of tiles may be formed of spatially separate tiles within the rendering space. Each set of tiles may, or may not, contain the same number of tiles.

In examples described herein, the processing of each particular tile is performed by a single one of the processor cores 422 within a processor group; that is, the processing of a tile is not divided between multiple cores 422 of a processor group (in the case that a processor group contains multiple cores). However, it is noted that in some other examples, the processing of a single tile could be divided amongst a plurality of processor cores within a particular processor group. Moreover, in the examples described herein, in the case that a set of tiles contains more than one tile, the tiles within a particular set that is allocated to a processor group may be processed by one or more of the processor cores within that group. However, the processing of an allocated set of tiles is not divided between multiple processor groups.

As part of performing the first render, the fetch unit 418 of the processing logic 412 fetches primitive data for rendering a tile and provides that data to a selected one of the processor groups based on the scheduling determined by the scheduling logic 416.

The processing logic 420 uses the processor cores 422 to execute operations on the primitive data for a tile in order to render the tile. The processing logic may contain other processing and/or memory resources such as registers, caches, control logic, etc. for performing the processing of the primitive data using the processor cores 422. The memory resource 414 may be used to store data used and/or generated by the processor cores 422. The processor cores may output data generated from processing tiles allocated as part of the first render to regions of the memory resource. The memory resource could for example be a set of one or more caches, buffers, or memories. There may be a dedicated memory resource for each processor core 422, or a dedicated memory resource for each group of processor cores 422. The memory resource—or memory resources— could be of any suitable structure, for example caches may be single level or multi-level.

The memory resource 414 may be arranged so that regions of the memory resource are associated with the tiles of the rendering space. That is, each region of the memory resource may store data generated from processing the one or more tiles associated with that region. For example, each tile of the rendering space may be associated with a respective region of the memory resource. More generally, each region of the memory resource 414 could be associated with a respective block of one or more tiles of the rendering space. These blocks of tiles may correspond to the same blocks of tiles forming the sets of tiles allocated to the processor groups. Alternatively, the blocks of tiles associated with each region of memory could be of different dimensions to the blocks of tiles forming the sets of tiles allocated to the processor groups. Thus, the memory resource 414 may be arranged as a two-dimensional array of regions corresponding to the tiles of the rendering space, where each region of the array corresponds to one or more tiles of the rendering space.

The processing logic 420 may perform deferred rendering such that hidden surface removal is performed on primitives to remove primitive fragments which are hidden from view by other primitives in the scene, and then texturing and/or shading is applied to the primitive fragments after the hidden surface removal has been applied to those primitive fragments. Texturing typically involves reading texture data from a memory and applying the texture to primitive fragments in order to determine colour values of rendered primitive fragments. Shading typically involves executing shader programs on primitive fragments to add visual effects to the rendering of the primitive fragment. These shader programs are the shader programs mentioned above that were compiled by the compiler 432 and provided to the rendering logic 420.

In other examples, the processing logic 420 may perform non-deferred rendering such that texturing and/or shading is applied to primitive fragments, and then hidden surface removal is performed on the textured/shaded primitive fragments to remove primitive fragments which are hidden from view by other primitives in the scene. Non-deferred rendering methods may be less efficient than deferred rendering methods because they involve unnecessarily shading and texturing of primitive fragments which are ultimately hidden in the scene.

Both the deferred rendering and non-deferred rendering systems described above implement rasterisation techniques to render primitive data. In other examples, other rendering techniques may be used in the rendering logic, for example a ray tracing technique may be used to render the primitive data.

As a processor core 422 completes the processing for a tile, it outputs the results of that processing for storage in the associated region of the memory resource 414 (i.e. the region of the memory resource associated with that tile).

At step 604, sets of one or more tiles for a second render are allocated to at least one group of processor cores for processing at a time when at least one other group of processor cores has not completed processing its allocated sets of tiles as part of the first render.

The second render may be initiated by the scheduling logic 416. The scheduling logic may allocate sets of one or more tiles for the second render to a group of processor cores that has completed processing its allocated sets of tiles for the first render. A processor group may be taken to have completed processing its allocated sets of tiles for the first render when each processor core within that group has finished processing its allocated tiles.

Figure 7:
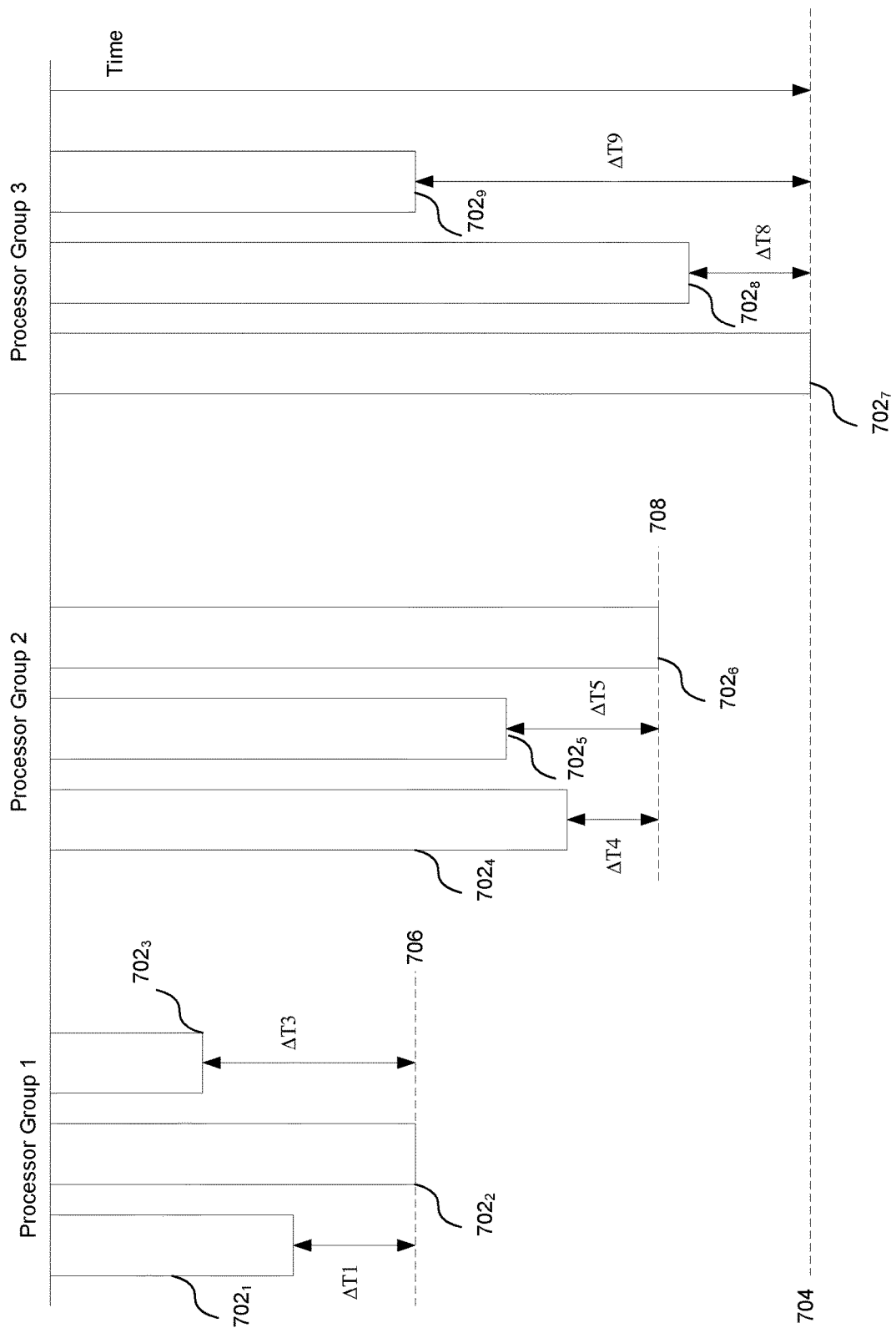
FIG. 7 shows an example of a workload distribution across three groups of processor cores, each group containing three processor cores.

FIG. 7 illustrates an example of the time taken for each processor core 422 to complete its processing of allocated tiles for the first render, and consequently the time taken for each processor group 502$_{1,2,3}$ to complete its processing of allocated tile sets for the first render. The vertical axis is the time elapsed since the beginning of the first render, with time increasing in the downwards direction.

The blocks 702$_{1-9}$ denote the time spent by a respective processor core 422$_{1-9}$ in processing its tiles allocated for the first render. The division of that time between different tiles (and tile sets) is not shown here for clarity. Thus a given block of time (e.g. block 702$_7$) may represent the time for a processor core 422 to process multiple tiles and/or sets of tiles.

The render end-time, i.e. the time taken to complete the first render, is shown at 704. The first render is completed when all of the tiles for the first render have been rendered by the processor cores. Thus the render end-time occurs when the processing for the final tile of the first render has been completed. As described above, the final tile to complete processing may not necessarily be the final tile to be allocated to a processor core.

The first processor group completes the processing of its allocated set(s) of tiles at a time 706; and the second processor group completes the processing of its allocated set(s) of tiles at a time 708. Both times 706 and 708 are before the render end-time 704. The third processor group completes the processing of its allocated set(s) of tiles at time 704.

The scheduling logic 416 may allocate sets of tiles for the second render to the first processor group at any time after time 706 (and before the end-time 704), and may allocate sets of tiles for the second render to second processor group at any time after time 708 (e.g. before the end-time 704). Thus, the scheduling logic 416 initiates the second render before the first render has completed.

To minimise idle time, the scheduling logic 416 may initiate the second render by allocating sets of tiles for the second render to the first processor group at time 706. At this time, both of the other processor groups) have yet to complete processing their allocated sets of tiles for the first render. The scheduling logic 416 may then begin also allocating sets of tiles to the second processor group at time 708. After the render end-time 704, the scheduling logic 416 may begin additionally allocating sets of tiles for the second render to the third processor group. Operating the scheduling logic in this way advantageously reduces the idle time of the processor cores.

It is noted that by only allocating sets of tiles for the second render to a processor group once each processor core within that group has completed its processing for the first render, idle time may still be present within the system (illustrated in FIG. 7 as the time intervals $\Delta T_1$; $\Delta T_3$; $\Delta T_4$, $\Delta T_5$, $\Delta T_8$ and $\Delta T_9$. However, waiting for each processor core within a group to complete its processing for the first render before allocating work for the second render to the cores of that group may offer other advantages, particularly when the processor cores of a given group share a resource of the graphics system. This will be explained in more detail below.

To summarise, the scheduling logic 416 is configured to allocate sets of one or more tiles to the processor cores for performing a first render, and at a time when at least one group of processor cores has not completed processing its allocated tile set(s) as part of the first render, initiate a second render by allocating sets of tiles for the second render to at least one of the other groups of processor cores, and processing those allocated tiles for the second render using that processor group. This advantageously allows the idle time of the processor cores to be reduced between renders.

At step 606, a progress indication is checked in response to a processor core requesting access to a region of the memory resource 414 as part of the second render. The progress indication indicates the progress of the first render.

At step 608, the region of the resource indicated in the request is accessed in response to the progress indication indicating that processing for the first render has been completed for that region of the resource.

The progress indication may be checked each time a processor core requests access to a region of the memory resource 414 whilst processing a tile allocated to it as part of the second render. The region of the memory resource 414 may be used by the processor cores when processing sets of tiles allocated as part of the first render. A processor core may wish to access a region of the memory resource to access data generated from the first render. For example, if the first render generated a texture, and the second render is to generate a downscaled version of that texture (e.g. for use in mip-mapping), then a processor core processing sets of tiles as part of the second render may need to reference data from the first render. Alternatively, the second render could apply filtering to the results of the first render (e.g. blurring). As another example, the first render could generate a shadow map, and as part of the second render that shadow map is to be applied to an image. In general, if data from a first render needs to be accessed, or referenced, in a subsequent render in order for that subsequent render to complete, the subsequent render may be said to be dependent upon the first render.

Step 606 is implemented by the progress check logic 428, which in this example is part of memory resource access unit 424. As shown, the memory resource access unit 424 may be a separate component to the processing logic 420 (though coupled to it). In an alternative configuration, the memory resource access unit 424 may form part of the processing logic 420.

When a processor core 422 requests access to a region of the memory resource 414 (e.g. in order to perform a processing task as part of the second render), that request may be received by the memory resource access unit 424. The progress check logic 428 then checks the progress of the first render against this access request. If the progress indication indicates that the processing of the first render has been completed for that region of the memory resource 414, the memory resource access unit 424 grants the access request to that region of the memory resource. The memory resource access unit 424 may communicate an indication that the access request has been granted to the processor core. In response, the processor core may access the requested region of the memory resource to fetch the appropriate data stored in that region. Alternatively, the memory resource access unit 424 may, in response to granting the request, forward the request to the memory resource. The memory resource may then return the appropriate data stored in that region of the memory resource. The data may be returned via the memory resource access unit, or may be returned directly to the processor core that initiated the request. If the progress indication indicates that the processing for the first render has not yet been completed for that region of the memory resource, the memory resource access unit 424 denies the processor core access to the data stored in that region. This prevents a processor core 422 from accessing incorrect data from the memory resource 414 in the event that data from the first render has yet to be written to that region of the memory resource, or in the event that data stored within that region is still modifiable by the remaining processing of the first render.

Processing for the first render may be determined to be complete for a region of the memory resource if data stored within that region of the resource is no longer modifiable by the first render (i.e. no longer modifiable by the processor groups still processing tile sets allocated as part of the first render). Such regions may be referred to as set, or completed regions for the first render. If a region of the memory resource is still modifiable by the first render, the region may be referred to as a volatile region.

The progress indication may be maintained, or generated, by the progress indication logic 426. The progress indication logic 426 is shown in this example as a separate component from the check logic 428, but in another implementation both the check logic 428 and progress indication logic 426 may be implemented as a single piece of progress logic configured to perform the functions of both the check logic 428 and the progress indication logic 426.

The progress indication logic may be configured to update the progress indication for a region of the memory resource 414 in accordance with an update scheme as the first render progresses. Examples of the form of the progress indication, and ways in which it may be updated, are described below.

The progress check logic 428 may be configured to re-check the progress indication each time the progress indication is updated by the progress indication logic 426. That is, the progress check logic may re-check the progress of the first render against the region of the memory resource of the access request. If, upon re-checking, the progress indication indicates that the processing for the first render has been completed for that memory resource region, the memory resource access unit 424 grants the access request to the memory region and either fetches the data stored in that region, or indicates to the processor core that it may now fetch the data. By re-checking the progress indication against the access request each time it's updated, the time the access request is spent pending can be reduced.

As described above, the memory resource 414 is arranged in this example so that the regions of the memory resource are associated with the tiles of the rendering space. That is, data for a tile is stored within a particular region of the memory resource. In this way there may be a mapping between regions of the memory resource and the spatial location of tiles within the rendering space. This is convenient because it allows the progress of the first render with respect to the tiles of the rendering space to be mapped to regions of the memory resource. In other words, a request to access a region of the memory resource can be mapped to the rendering space where a comparison with the progress indication can determine whether that region of rendering space has been processed for the first render.

The progress indication maintained by the progress indication logic 426 indicates rendering areas of the rendering space for which processing for the first render has been completed. The rendering areas may specify the finest granularity to which the progress of the first render can be known. That is, a rendering area may be the smallest area of the rendering space for which it can be known whether the processing for the first render has completed or not. Each rendering area may comprise at least one tile. More particularly, each rendering area may be of at least equal dimensions (i.e. have at least the same height and width) as each set of one or more tiles that are allocated to the processor cores 422. Thus each rendering area may comprise at least one set of tiles. In other words, in examples described herein, the granularity of the rendering areas may be equal to, or coarser than, the granularity of the tile sets in the rendering space. In some instances, each rendering area may be larger (in one or both dimensions) than the sets of one or more tiles that are allocated to the processor cores (i.e. each rendering area comprises a plurality of tile sets). As a simple illustration, and referring back to FIG. 2, the rendering space may be divided into four rendering areas in a 2×2 arrangement, where each rendering area comprises a 2×1 arrangement of tile sets (each tile set comprising a 2×3 block of tiles). That is, a first rendering area comprises tile sets (0,0) and (0,1); a second rendering area comprises tile sets (0,2) and (0,3); a third rendering area comprises tile sets (1,0) and (1,1) and the fourth rendering area comprises tile sets (1,2) and (1,3).

In one example, the progress indication is in the form of a set of flags corresponding to each of the rendering areas. That is, each flag in the set corresponds to a respective rendering area. The value of the flag can indicate whether the first render has been completed for each tile located within the corresponding rendering area. For example, if the first render has been completed for each tile located within a given rendering area, the flag for that rendering area may be set. If the first render has not been completed for a given rendering area (i.e. the processing of one or more tiles within that rendering area has yet to complete), the flag associated with that rendering area may be not set. Thus, by referencing the set of flags, it can be known for which rendering areas of the rendering space processing for the first render has been completed.

Figure 8:
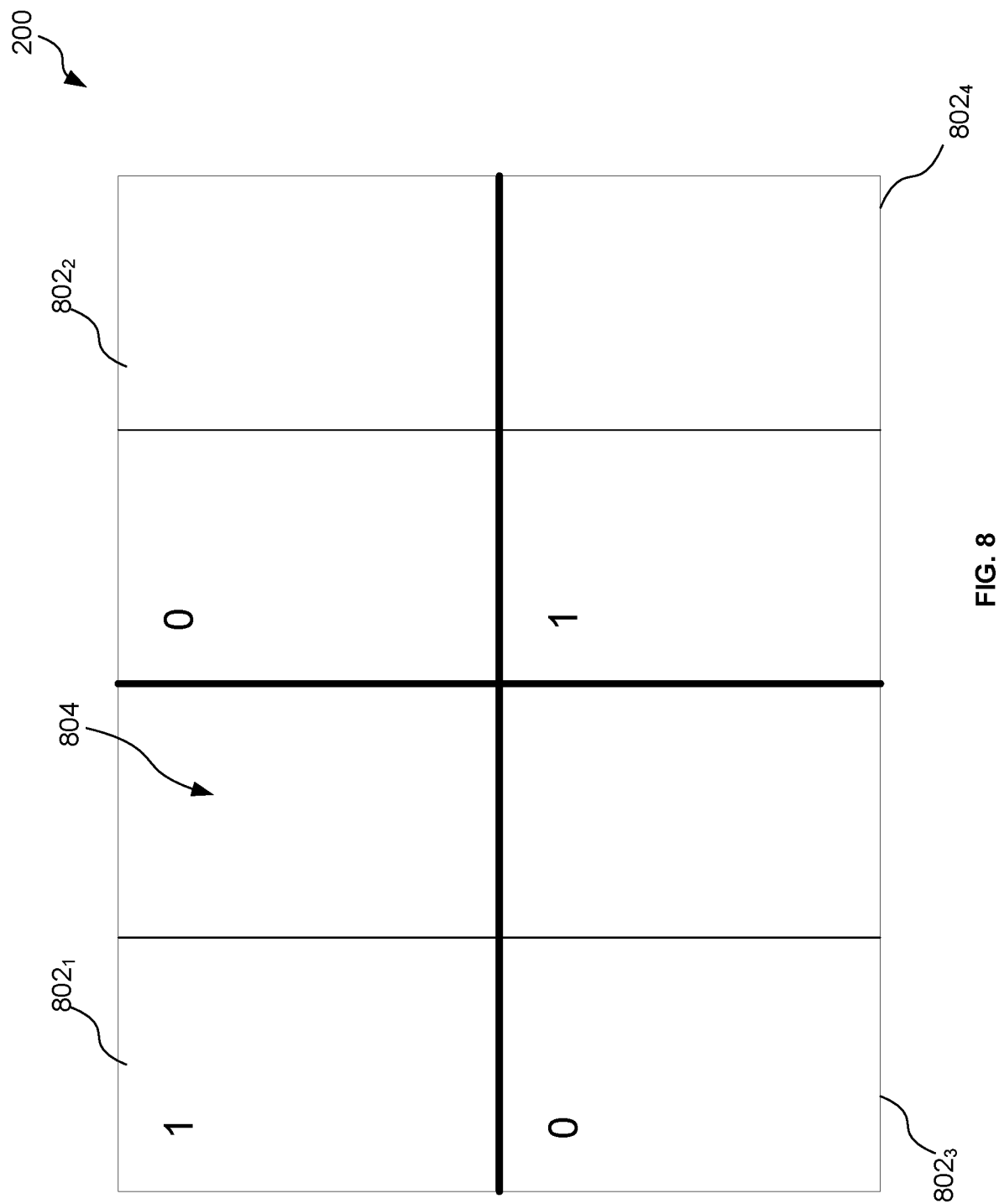
FIG. 8 shows an example of a rendering space divided into a plurality of rendering areas, where each rendering contains a block of tile sets.

FIG. 8 illustrates how flags can be used to identify areas of the rendering space for which the first render has been completed.

FIG. 8 shows the rendering space 200 divided into a plurality of rendering areas $802_{1-4}$. Each rendering area comprises two sets of tiles arranged in a 2×1 block. Each set of tiles itself comprises a block of 2×3 tiles as described above and shown in FIG. 2. The rendering areas are delineated by the thicker border lines, with the tile sets being delineated by the thinner border lines. Individual tiles are not illustrated in FIG. 8 for the purposes of clarity. Each rendering area is associated with a respective flag, which in this example is a one-bit flag that takes a value of '1' or '0'. A value of '1' (in this example) indicates that the first render has been completed for each set of tiles (and thus each tile within those sets) for a given rendering area. A value of '0' indicates that the first render has not been completed for at least one tile of the associated rendering area.

An example of how the memory resource access unit 424 can use the flags to grant or block requests to portions of the memory resource 414 will now be described.

Consider an example in which a processor core 422 is processing a tile as part of the second render, and makes an access request to a region of the memory resource 414 to access data from the first render. Note that the access request need not correspond to a region of memory resource 414 associated with the tile being processed at processor core 422 as part of the second render, and that there need not be any correspondence between rendering spaces, tile configurations, etc., of the two renders. The memory address and/or screen space location of the request may correspond to any location within the rendering space of the first render. The progress check logic 428 receives the access request and determines from the memory address of the request that the request is for data of a tile located within the tile set 804 located within rendering area $802_1$. A check of the set of flags maintained by the progress indication logic 426 confirms that the flag for that rendering area is set, and thus the processing for the first render has been completed for that region of the memory resource (i.e. first render has been completed for the tile corresponding to that region of the memory resource). In response, the memory resource access unit 424 may grant access to the requested region of the memory resource. In another example, the progress check logic 428 may receive the access request and determine from the memory address of the request that the request is for data of a tile located within rendering area $802_3$. The progress check logic 428 then checks the set of flags maintained by the progress indication logic 426 and determines that the flag associated with rendering area $802_3$ is not set (i.e. the processing for the first render has not been completed for at least one tile within the rendering area $802_3$). In response, the memory resource access unit 424 may block access to the requested region of the memory resource.

It is noted that due to the potentially different granularities of the rendering areas and the tiles (or sets of tiles), it is possible that an access request will be blocked when in fact the necessary processing for the first render for that request had been completed. This is because the flags do not indicate which tiles (or sets of tiles) within a rendering area have been processed for the first render and which have not; if at least one tile within a rendering area has not been rendered for the first render, then the flag for the whole rendering area is not set. One solution to this problem is to increase the granularity of the rendering areas, for example by associating a flag with each individual tile. However, this approach suffers from the drawback of increased data storage demands to store the necessary numbers of flags for the progress indications. Thus, whilst having each rendering area cover multiple tiles may result in some access requests being unnecessarily blocked, it does provide the advantage of reducing the data storage demands for the flags.

The progress indication logic 426 may update (i.e. change) the value of a flag when the first render has been completed for each tile located within that rendering area. If a set flag indicates that the first render has been completed for a rendering area, then the progress indication logic 426 may set the flag for a rendering area upon the completion of the first render for each tile within that rendering area.

Using flags to represent the progress of the first render is convenient because it enables a progress indication for each rendering area that has been rendered according to the first render to be identified, regardless of the spatial position of that rendering area within the rendering space.

The progress indication maintained by the progress indication logic 426 may alternatively take the form of a count value. The progress indication logic 426 may implement a counter to maintain the count value. The counter may count the number of consecutive rendering areas that have been rendered according to the first render. The consecutive rendering areas may be rendering areas of a sequence in a predetermined order within the rendering space. That predetermined order could for example be a raster scan, boustrophedon order, z-order etc. The sequence may be counted from a predetermined position within the rendering space. For example, the sequence of rendering areas may begin with the top-leftmost rendering area of the rendering space. The counter may stop when the first rendering area encountered by following the ordered sequence has not had its processing for the first render completed. The progress indication logic may be configured to increment the counter when the processing of a rendering area for the first render is completed that extends the sequence of consecutive rendering areas that have had their processing completed for the first render.

For example, referring to FIG. 8, a counter configured to count the number of consecutive completed rendering areas for the first render following a raster scan order would have a value of 1 (corresponding to rendering area $802_1$). If the rendering area $802_2$ for the first render is completed prior to the rendering area $802_3$, the counter would then increment to two because the completion of the rendering for rendering area $802_2$ extends the sequence of completed rendering areas for the first render to two (corresponding to rendering areas $802_{1,2}$). However, if the rendering area $802_3$ for the first render completes prior to rendering area $802_2$, the counter will not increment because the number of consecutive completed rendering areas will not have increased. By using knowledge of the counter value and the predetermined order of rendering areas within the rendering space, the progress check logic 428 can determine which rendering areas have had their processing completed for the first render.

The counter may be implemented in combination with a FIFO buffer. Both the counter and buffer may form part of the progress indication logic 426. The FIFO buffer may be used to control the incrementing of the counter. Each rendering area may be associated with a respective value (e.g. a '0' or a '1'). The buffer is configured to generate a sequence of values corresponding to the rendering areas of a predetermined order within the rendering space (e.g. raster scan, boustrophedon, z-order etc.). If the leading value of the sequence indicates that the processing of the corresponding rendering area has been completed for the first render (e.g. the value is a '1'), then that value is output from the buffer and in response the counter is incremented. That is, the counter may be configured to increment each time the buffer outputs a value. When the leading value in the buffer indicates that the processing of the corresponding rendering area has not been completed for the first render (e.g. the leading value is '0'), that value is not output from the buffer and subsequently received values at the buffer are added sequentially to the tail-end of the buffer. When the processing for the rendering area corresponding to the leading value held in the buffer is completed for the first render, that leading value is changed to reflect this and then output from the buffer, causing the counter to increment.

For example, initially the buffer may be empty. If rendering area $802_1$ is the first rendering area to complete for the first render, a '1' is input into the buffer and then output, causing the counter to increment to '1'. If the next rendering area to complete for the first render is $802_4$, the string '001' is input into the buffer. This string indicates that the next rendering areas of the sequence, $802_2$ and $802_3$, have not completed for the first render, but the rendering area $802_4$ has completed. The leading '0' values in the buffer prevent the value '1' from being output and causing the counter to increment. Thus, the bit for the completed rendering area $802_4$ is effectively queueing behind the placeholder '0' values representing the rendering areas that have not yet completed. If a rendering area completes that already has a '0' value stored in the buffer, this value is modified and set to a '1'. For example, if the rendering area $802_3$ is the next rendering area to complete, the string stored in the buffer is modified to '011', the '0' value indicating that rendering area $802_2$ has yet to complete. In contrast, if the next rendering area to complete is $802_2$, the string in the buffer is modified to '101'. The leading '1' bit is then output from the buffer, causing the counter to increment, leaving the string '01' in the buffer.

In some implementations, it is possible for different processing cores (e.g. belonging to different processor groups) to share a processing resource of the graphics processing system (e.g. a texture processing unit). If two (or more) processor cores share a common resource but belong to different processor groups, it is possible for one of the processor cores to begin processing tiles as part of the second render whilst another processor core (that shares the same processing resource) is still processing tiles as part of the first render.

Because both processor cores share the same resource, scheduling one of the processor cores to begin processing tiles for the second render whilst other processor cores are still processing tiles for the first render may result in a processing resource deadlock. Deadlock may occur, for example, when access to a hardware resource is needed by a processor core to complete its processing for the first render, but access to that hardware resource is blocked by the processor core that is processing tiles as part of the second render.

Figure 9:
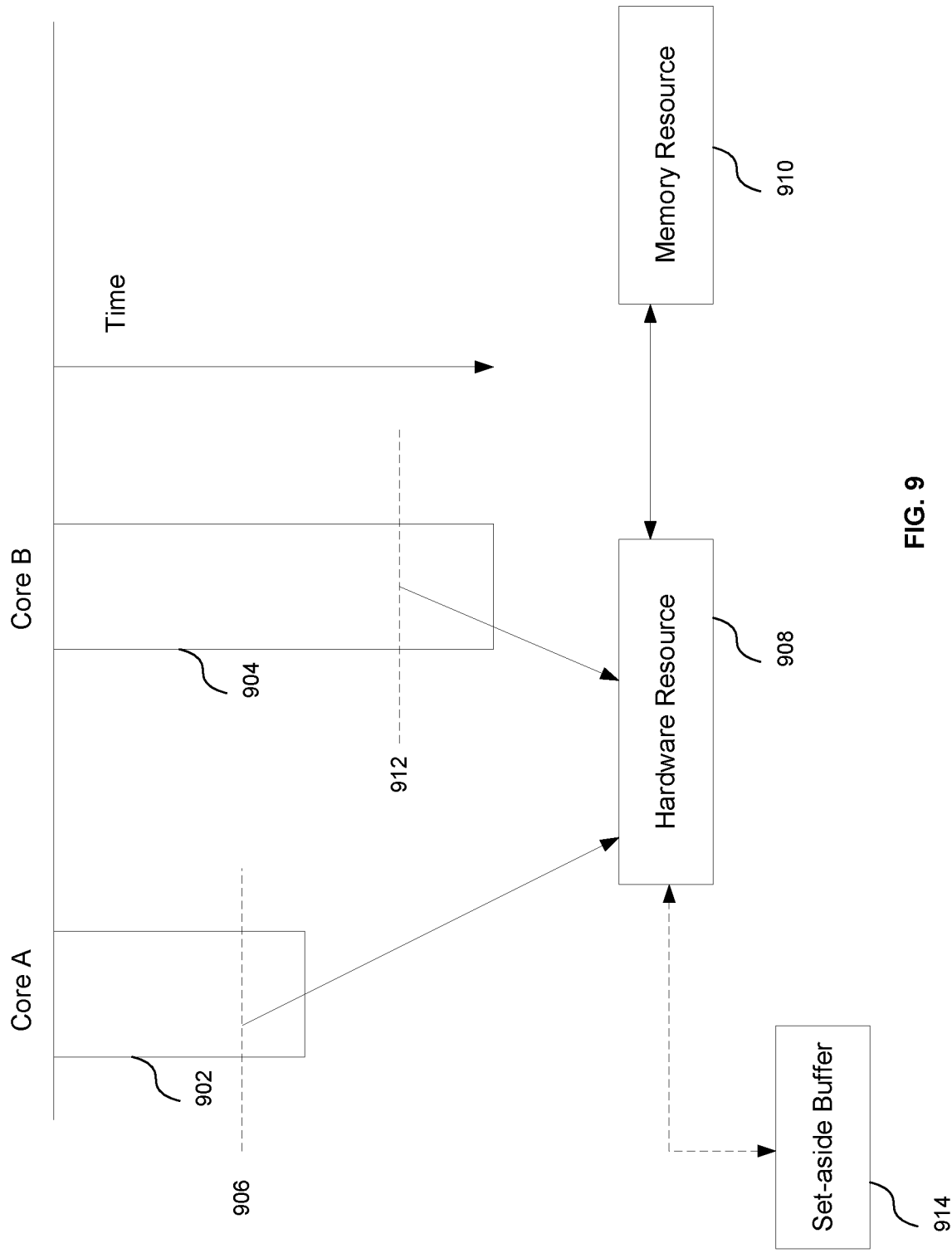
FIG. 9 is a schematic illustration of how a processing resource deadlock may arise.

A schematic illustration of how deadlock might occur is shown in FIG. 9.

In FIG. 9, processor core A is processing an allocated set of one or more tiles as part of a render N+1, and processor core B is processing an allocated set of one or more tiles as part of a render N (preceding render N+1). Render N may be referred to as the first render, and render N+1 as the second render. Block 902 represents the time processor core A spends processing its allocated sets of tiles, and block 904 represents the time processor core B spends processing its allocated set of tiles.

At time 906, processor core A accesses a hardware resource 908 in order to obtain a data element, or value, from a region of the memory resource 910. For example, the hardware resource 908 could be a texture processor unit that handles texel requests, and the element of data could be a texel value that is stored in the memory resource 910. In other words, processor core A is requesting (via the hardware resource 908) access to a region of the memory resource 910. Hardware resource 908 is shared by processor cores A and B.

Upon checking the progress indication, the hardware resource 908 determines that the processing for the first render has not been completed for the region of memory that processor core A is requesting access to (e.g. the flag has not been set for that region). Thus the access request is blocked and remains pending within the hardware resource 908.

At time 912, processor core B requests access to the shared hardware resource 908 as part of its processing for the first render. However, the hardware resource remains blocked by the prior request of processor core A. Thus, core A's memory access request cannot be granted, and core B's access to the hardware resource also cannot be granted (due to core A's request blocking the hardware resource), meaning core B is blocked from completing its processing for the first render. This scenario is an example of deadlock.

The presence of deadlock may lead to large increases in latency and in extreme cases may prevent further processing within the processor cores and renders never completing.

To avoid deadlock situations, the graphics processing system may comprise a buffer 914 that can buffer certain requests that may lead to deadlock and free-up the shared hardware resource so that it may process subsequent requests. The buffer 914 may be referred to as a "set-aside" buffer. It may form part of the memory access request unit as shown in FIG. 4 (where the set-aside buffer is denoted 430).

The set-aside buffer 914 may be configured to buffer access requests to regions of the memory resource for which the progress indication indicates that processing for the first render has not been completed. The buffer may store an access request by storing data indicating the location of the region of the resource for which access has been requested. The buffer may also store an indication of the processor core that made the request. If the processing for the first render has been completed for the region of the memory resource in the access request, that request will not block the shared hardware resource 908 and so does not need to need to be buffered.

The set-aside buffer is arranged so that once it buffers an access request, that access request does not impede, or block a subsequent request to the shared processing resource 908. Thus, the set-aside buffer is arranged so that a (temporally) subsequent request for a processing resource needed to complete the processing for the first render for a region of the memory resource specified by a (temporally) prior access request located in the buffer is not impeded by that prior access request.

In other words, the set-aside buffer 914 could buffer the access request made by core A at time 906, meaning this request would not impede the hardware resource request made by core B at time 912, thus avoiding the deadlock.

The set aside buffer may be controlled by the progress check logic 428. For example, the progress check logic may be configured to cause an access request to a region of the memory resource to be buffered in response to the progress indication indicating that the processing for the first render has not been completed for that region of the memory resource. This is a convenient arrangement because the progress check logic can readily check the value of the progress indication.

The progress check logic 428 may be configured to grant an access request to a region of the memory resource that is buffered within the set-aside buffer in response to the progress indication being updated to indicate that the processing for the first render for that region of the memory resource has been completed (e.g. in response to the flag associated with that region of the memory resource being set). At this point, the progress check logic may remove the access request from the set-aside buffer.

The above examples describe how a graphics processing system can initiate a second render by processing sets of tiles at a group of one or more processor cores at a time when at least one other group of processor cores is still processing tiles allocated as part of a first (previous) render. By checking the progress of the first render in response to a processor core that is processing tiles as part of the second render requesting access to data in a memory resource, processor cores processing tiles as part of the second render can be prevented from accessing regions of memory that are still modifiable by the first render. Thus, the second render can be initiated prior to the completion of the first render (potentially reducing processor core idle time), whilst reducing the possibility of the second render adversely affecting the first render.

A number of variations and modifications may be made to the examples described above.

For instance, in the examples described thus far, the processing logic comprised a number of processor cores arranged into groups of three. In other examples, each processor group may contain a greater or fewer number of processor cores. For instance, each processor group may contain a single processor core. An example of how the graphics processing unit initiates the second render as part of performing step 604 in the case that each processor group contains a single processor core is illustrated in FIG. 10.

Figure 10:
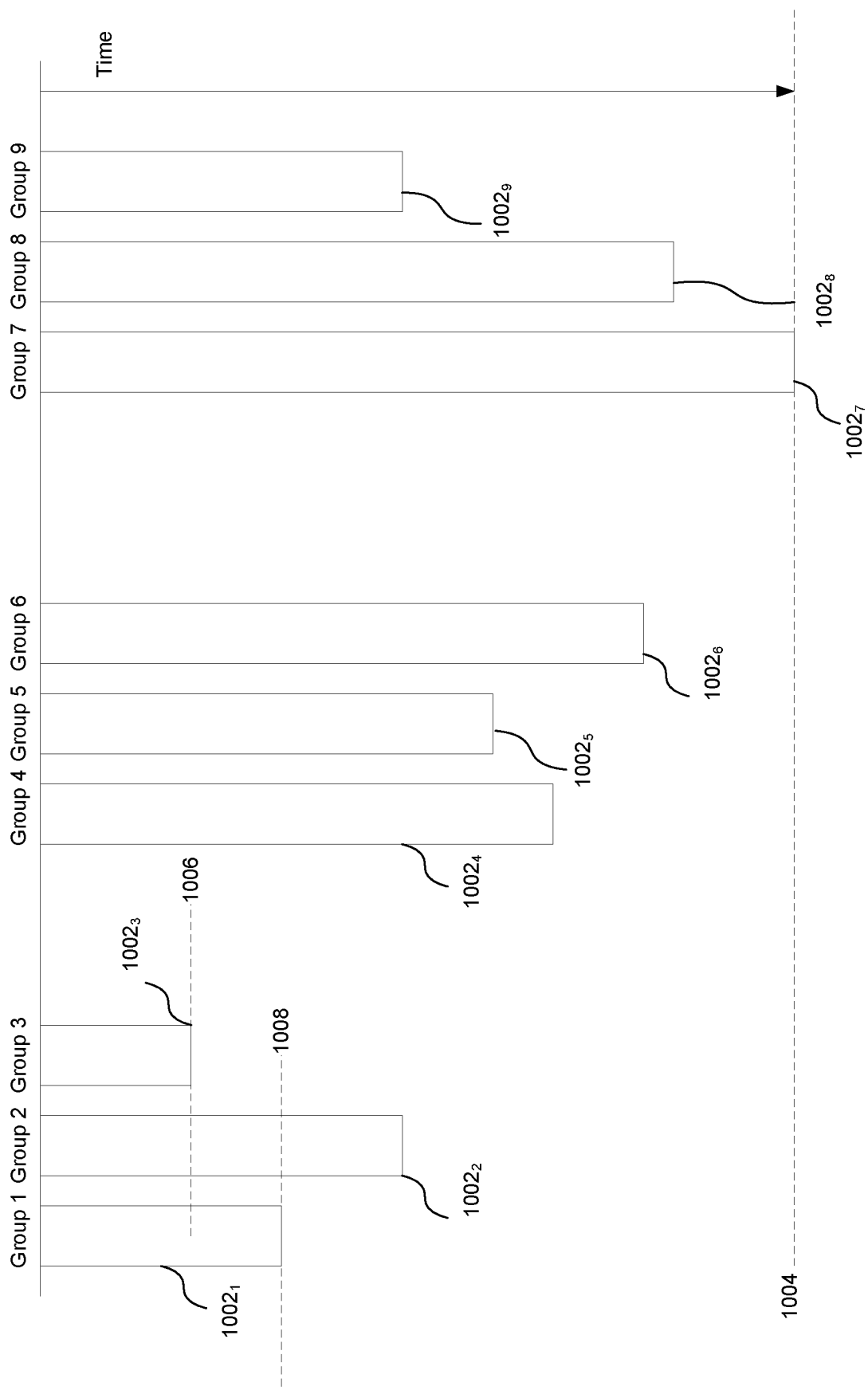
FIG. 10 shows an example of a workload distribution across nine processor groups, where each group contains a single processor core.

FIG. 10 shows the workload distribution for processor cores $422_{1-9}$. Each processor core forms a respective processor group. Blocks $1002_{1-9}$ represent time taken for the respective processor cores $422_{1-9}$ to complete the processing of its allocated set(s) of one or more tiles for the first render. The end-time for the first render is shown at 1004, and corresponds to the time taken for the processor core $422_7$ of the seventh processor group to complete its processing for the first render.

The processor core $422_3$ of the third group completes its processing for the first render at time 1006 (occurring at a time before the end-time 1004).

The scheduling logic 416 may allocate sets of one or more tiles for the second render to the processor core $422_3$ at any time after time 1006 (and before time 1004). Processor core $422_3$ can then initiate the second render by processing these allocated set(s) of one or more tiles. To minimise idle time, the scheduling logic may allocate the set(s) of one or more tiles for the second render to processor core $422_3$ at time 1006.

Similarly, processor core $422_1$ completes its processing for the first render at time 1008 (before the render end-time 1004). The scheduling logic may therefore allocate set(s) of one or more tiles to processor core $422_1$ for the second render at any time after time 1008, and before time 1004. The processor core $422_1$ can then process those allocated set(s) of tiles for the second render. Again, to minimise idle time, the scheduling logic may allocate the set(s) of one or more tiles to the processor core $422_1$ at time 1008.

The scheduling logic may allocate set(s) of one or more tiles for the second render to each of processor cores $422_2$, $422_{4-8}$ and $422_{8,9}$ in a similar way, since each of these processor cores finishes their processing for the first render prior to the first render end-time 1004.

It can be appreciated from a comparison of FIGS. 7 and 10 that arranging each processor group to contain only a single processor core may further reduce idle time of individual processor cores. This is because, if a processor group contains multiple processor cores, tile set(s) for the second render may not be allocated to a processor group until each processor core within that group has completed its processing for the first render. However, certain graphics processing systems may contain processor groups formed of multiple processor cores due to hardware efficiencies that may be gained by such an arrangement, for example the sharing of physical resources (e.g. texture units) by each processor core of a group.

The examples described herein have referred to 'first' renders and 'second' renders. It is to be understood that those terms have been used to define the relative order of the renders for the purpose of illustration; the labels 'first' and 'second' have not been used to imply any absolute order of the renders as performed by the graphics processing system, i.e. the 'first render' as described herein may not necessarily be the first render performed by the graphics processing system. Furthermore, though the examples described herein refer to initiating a second render at a time prior to the completion of the first render, it will be appreciated that the techniques described herein are applicable to longer sequences of renders. For example, the graphics processing unit may operate to initiate a third render at a time prior to the completion of the second render, a fourth render prior to the completion of the third render etc.

Thus far, examples have been described in the context of a graphics processing system that processes graphics data using a rendering space sub-divided into a plurality of tiles. However, the techniques described herein are not limited to such applications, and may be applicable to renders that do not utilise tile-based graphics pipelines. Furthermore, though the above examples have been described in the context of renders that generate two-dimensional image/texture data, the techniques described herein are applicable to renders that generate other types of graphics data, which may be one-dimensional (1D), two-dimensional (2D) or three-dimensional (3D) data.

Thus, more generally, the processor groups may each be configured to render graphics data (e.g. 1D, 2D or 3D data) by processing allocated rendering tasks. Those rendering tasks may specify rendering graphics data for a set of tiles (as in the examples above), but may specify rendering other types of graphics data. As the processor cores of the groups process the rendering tasks, data generated from processing those tasks is output to regions of a memory resource. The progress indication logic may then be configured to track the progress of the first render by identifying which regions of the memory resource are associated with rendering tasks which have been completed for the first render. That is, the progress indication logic identifies regions of the memory resource for which processing of rendering tasks for the first render has been completed. The progress indication logic may maintain a progress indication that indicates the progress of the first render. That progress indication may be in the form of flags, where a flag is set for each region of the memory resource once the processing for the first render is completed for that region (i.e. once the data in that region is no longer modifiable by the processor groups performing the first render). Regions of the memory resource that contain data that is still modifiable by the first render (and so may not have an associated set flag) may be referred to as volatile regions. Regions of the memory resource that contain data no longer modifiable by the first render may be referred to as set, or complete regions. When a processor core requests access to a region of the memory resource to process an allocated rendering task for the second render, the progress check logic first checks the progress indication maintained by the progress indication logic to determine the progress of the first render. If the progress indication indicates that processing for the first render has been completed for that region (e.g. the region is a complete, or set region), then the processor core is granted access to that region. If the progress indication indicates that processing for the first render has not completed for that region (e.g. the region is a volatile region), the processor core is denied access to that region. The progress indication could comprise a set of flags. Each flag may correspond to a region of the memory resource, and the progress indication logic may set the flag associated with a region of the resource when processing for the first render has completed for that region (in the examples above, the flags corresponded to regions of the memory resource, and also to tiles of the rendering space by virtue of the mapping between the regions of the resource and the tiles). As in the examples above, this control of access to regions of the memory resource may again be controlled by the memory resource access unit.

Thus, in accordance with the techniques described herein, there may be provided a graphics processing unit configured to process graphics data, the graphics processing unit comprising: multiple processor groups each formed of one or more processor cores and each configured to render graphics data by processing allocated rendering tasks, wherein data for processed rendering tasks is output to regions of a memory resource; scheduling logic configured to: allocate rendering tasks to the processor groups for processing to perform a first render; at a time when at least one of the processor groups has not completed processing its allocated rendering task(s) as part of the first render, allocating at least one rendering task for a second render to at least one of the other processor groups for processing; progress indication logic configured to maintain a progress indication indicating progress of the first render, the progress indication indicating regions of the memory resource for which processing for the first render has been completed; and progress check logic configured to check the progress indication in response to a processor core requesting access to a region of the memory resource as part of the second render and to enable the processor core to access that region of the resource in response to the progress indication indicating that processing for the first render has been completed for that region.

There may also be provided A method of processing graphics data in a graphics processing unit comprising multiple groups of one or more processor cores, the method comprising: performing a first render by allocating rendering tiles to the groups of processor cores for rendering and outputting data for the processed rendering tasks to regions of a memory resource; at a time when at least one of the groups of one or more processor cores has not completed processing its allocated rendering task(s) as part of the first render, allocating at least one rendering task for a second render to at least one of the other processor groups for processing; maintaining a progress indication indicating progress of the first render, the progress indication indicating regions of the memory resource for which processing for the first render has been completed; checking the progress indication in response to a processor core requesting access to a region of the memory resource as part of the second render; and accessing that region of the resource in response to the progress indication indicating that processing for the first render has been completed for that region of the memory resource.

The processor groups could for example be configured to render 3D graphics data, e.g. as part of a fluid simulation. In this case, the processor cores could be configured to process allocated rendering tasks for the first render to generate simulation values for voxels, and then output those values to regions of the memory resource. Each region of the memory resource may therefore store data for—and thus be associated with—a set of one or more voxels. A second render can then be initiated before simulation values have been generated for all of the voxels as part of the first render. As long as a voxel is associated with a set or completed region of the memory resource for the first render, a processor core can process an allocated rendering task to generate a simulation value for that voxel as part of the second render—there is no need to wait for simulation values to be calculated for all of the voxels as part of the first render.

The graphics processing system described with reference to FIGS. 4-10 is shown as comprising a number of functional blocks. This is schematic only and is not intended to define a strict division between different logic elements of such entities. Each functional block may be provided in any suitable manner. It is to be understood that intermediate values described herein as being formed by a graphics processing system or graphics processing unit need not be physically generated by the graphics processing unit at any point and may merely represent logical values which conveniently describe the processing performed by the graphics processing unit/system between its input and output.

The graphics processing systems/units described herein may be embodied in hardware on an integrated circuit. The graphics processing systems/units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing unit configured to perform any of the methods described herein, or to manufacture a graphics processing unit comprising any apparatus described herein. An integrated circuit definition dataset may be, for example, an integrated circuit description.

There may be provided a method of manufacturing, at an integrated circuit manufacturing system, a graphics processing unit as described herein. There may be provided an integrated circuit definition dataset that, when processed in an integrated circuit manufacturing system, causes the method of manufacturing a graphics processing unit to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing unit will now be described with respect to FIG. 11.

Figure 11:
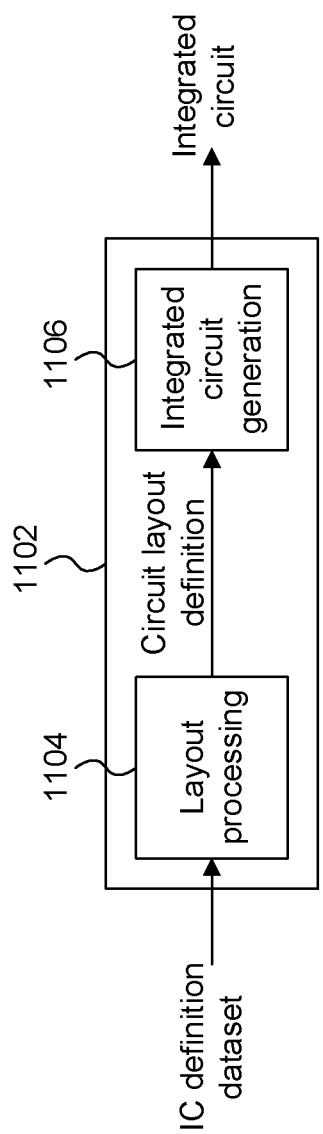
FIG. 11 is a schematic diagram of an integrated circuit manufacturing system.

FIG. 11 shows an example of an integrated circuit (IC) manufacturing system 1102 which is configured to manufacture a graphics processing unit as described in any of the examples herein. In particular, the IC manufacturing system 1102 comprises a layout processing system 1104 and an integrated circuit generation system 1106. The IC manufacturing system 1102 is configured to receive an IC definition dataset (e.g. defining a graphics processing unit as described in any of the examples herein), process the IC definition dataset, and generate an IC according to the IC definition dataset (e.g. which embodies a graphics processing unit as described in any of the examples herein). The processing of the IC definition dataset configures the IC manufacturing system 1102 to manufacture an integrated circuit embodying a graphics processing unit as described in any of the examples herein.

The layout processing system 1104 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1104 has determined the circuit layout it may output a circuit layout definition to the IC generation system 1106. A circuit layout definition may be, for example, a circuit layout description.

The IC generation system 1106 generates an IC according to the circuit layout definition, as is known in the art. For example, the IC generation system 1106 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1106 may be in the form of computer-readable code which the IC generation system 1106 can use to form a suitable mask for use in generating an IC.

The different processes performed by the IC manufacturing system 1102 may be implemented all in one location, e.g. by one party. Alternatively, the IC manufacturing system 1102 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 11 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 11, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The graphics processing systems described herein may be embodied in hardware on an integrated circuit. The graphics processing systems described herein may be configured to perform any of the methods described herein.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A graphics processing unit configured to process graphics data using a rendering space that is sub-divided into a plurality of tiles, the graphics processing unit comprising:
multiple groups of one or more processor cores configured to render graphics data by processing allocated tiles, wherein data for processed tiles is output to regions of a memory resource;
scheduling logic configured to:
allocate sets of one or more tiles to the groups of processor cores for rendering to perform a first render; and
at a time when at least one of the groups of one or more processor cores has not completed processing its allocated set(s) of one or more tiles as part of the first render, allocate at least one set of one or more tiles for a second render to at least one of the other groups of one or more processor cores for processing;
progress indication logic configured to maintain a progress indication indicating progress of the first render, the progress indication indicating regions of the memory resource for which processing for the first render has been completed; and
progress check logic configured to check the progress indication in response to a processor core requesting access to a region of the memory resource as part of the second render and to enable the processor core to access that region of the resource in response to the progress indication indicating that processing for the first render has been completed for that region.

2. The graphics processing unit as claimed in claim 1, wherein the progress indication logic is configured to update the progress indication in accordance with an update scheme as the first render progresses.

3. The graphics processing unit as claimed in claim 2, wherein the progress check logic is configured to re-check the progress indication each time the progress indication is updated.

4. The graphics processing unit as claimed in claim 1, wherein the memory resource is arranged as a two-dimensional array corresponding to the tiles of the rendering space such that the processing for the first render has been completed for a region of the memory resource when the one or more tiles corresponding to that memory region have been rendered for the first render.

5. The graphics processing unit as claimed in claim 4, wherein the progress check logic is configured to check the progress indication by mapping the spatial location in the memory resource of the access request to an area of the rendering space and using the progress indication to determine whether all the tiles within that area have been processed in accordance with the first render.

6. The graphics processing unit as claimed in claim 1, wherein the progress indication identifies at least a subset of rendering areas of the rendering space for which processing has been completed for the first render, each rendering area comprising at least one tile.

7. The graphics processing unit as claimed in claim 6, wherein each of the rendering areas is of at least equal dimensions to each set of one or more tiles assigned to the processor cores.

8. The graphics processing unit as claimed in claim 6, wherein the progress indication identifies each of the rendering areas of the rendering space for which processing has been completed for the first render.

9. The graphics processing unit as claimed in claim 6, wherein the progress indication comprises a set of flags corresponding to each of the rendering areas, and the progress indication logic is configured to set the flag corresponding to a rendering area when the processing of each tile within that area has been completed for the first render.

10. The graphics processing unit as claimed in claim 6, wherein the progress indication identifies a consecutive sequence of rendering areas in accordance with a predetermined order for which processing has been completed for the first render.

11. The graphics processing unit as claimed in claim 10, wherein the progress indication logic is configured to update the progress indication upon completion of the processing of a rendering area that extends the consecutive sequence of rendering areas in accordance with the predetermined order.

12. The graphics processing unit as claimed in claim 10, wherein the progress indication comprises a counter indicating the number of rendering areas in the consecutive sequence for which processing has been completed for the first render.

13. The graphics processing unit as claimed in 12, wherein the progress indication logic comprises a first-in-first-out (FIFO) buffer for controlling the incrementing of the counter, the buffer being configured to receive a sequence of values corresponding to respective rendering areas, each value indicating whether the processing of its corresponding rendering area has been completed for the first render.

14. The graphics processing unit as claimed in claim 13, wherein the FIFO buffer is configured to output its leading value when that value indicates the processing of its corresponding rendering area has been completed for the first render, and to not output its leading value when that value indicates that the processing of its corresponding rendering area has not been completed for the first render; and wherein the counter is configured to increment in response to the buffer outputting its leading value.

15. The graphics processing unit as claimed in claim 1, wherein each group of one or more processor cores contains only a single processor core.

16. The graphics processing unit as claimed in claim 1, wherein each group of one or more processor cores contains a plurality of processor cores, and wherein each of the plurality of processor cores within a group shares a common processing resource of the graphics processing unit.

17. The graphics processing unit as claimed in claim 1, wherein the graphics processing unit further comprises a buffer configured to buffer access requests to regions of the memory resource, the progress check logic being configured to cause an access request to be buffered when the progress indication indicates that the processing for the first render has not been completed for the region of the memory resource specified by that access request.

18. The graphics processing unit as claimed in claim 17, wherein the buffer is arranged so that a request for a processing resource needed to complete the processing for the first render for a region of the memory resource specified by an access request located in the buffer is not impeded by the access request located in the buffer.

19. A method of processing graphics data in a graphics processing unit comprising multiple groups of one or more processor cores, the graphics processing unit being configured to use a rendering space that is sub-divided into a plurality of tiles, the method comprising:
performing a first render by allocating sets of one or more tiles to the groups of processor cores for rendering and outputting data for the processed tiles to regions of a memory resource;
at a time when at least one of the groups of one or more processor cores has not completed processing its allocated set(s) of one or more tiles as part of the first render, allocating at least one set of one or more tiles for the second render to at least one of the other groups of one or more processor cores for processing;
maintaining a progress indication indicating progress of the first render, the progress indication indicating regions of the memory resource for which processing for the first render has been completed;
checking the progress indication in response to a processor core requesting access to a region of the memory resource as part of the second render; and
accessing that region of the resource in response to the progress indication indicating that processing for the first render has been completed for that region of the memory resource.

20. A non-transitory computer readable storage medium having stored thereon a computer readable dataset description of an integrated circuit that, when processed in an integrated circuit manufacturing system, causes the integrated circuit manufacturing system to manufacture a graphics processing unit configured to process graphics data using a rendering space that is sub-divided into a plurality of tiles, wherein the graphics processing unit comprises:
multiple groups of one or more processor cores configured to render graphics data by processing allocated tiles, wherein data for processed tiles is output to regions of a memory resource;
scheduling logic configured to:
allocate sets of one or more tiles to the groups of processor cores for rendering to perform a first render; and
at a time when at least one of the groups of one or more processor cores has not completed processing its allocated set(s) of one or more tiles as part of the first render, allocate at least one set of one or more tiles for a second render to at least one of the other groups of one or more processor cores for processing;
progress indication logic configured to maintain a progress indication indicating progress of the first render, the progress indication indicating regions of the memory resource for which processing for the first render has been completed; and
progress check logic configured to check the progress indication in response to a processor core requesting access to a region of the memory resource as part of the second render and to enable the processor core to access that region of the resource in response to the progress indication indicating that processing for the first render has been completed for that region.

* * * * *